US008223340B2

(12) United States Patent
Digonnet et al.

(10) Patent No.: US 8,223,340 B2
(45) Date of Patent: *Jul. 17, 2012

(54) LASER-DRIVEN OPTICAL GYROSCOPE HAVING A NON-NEGLIGIBLE SOURCE COHERENCE LENGTH

(75) Inventors: Michel J. F. Digonnet, Palo Alto, CA (US); Shanhui Fan, Stanford, CA (US); Seth Lloyd, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/767,643

(22) Filed: Apr. 26, 2010

(65) Prior Publication Data

US 2010/0302548 A1 Dec. 2, 2010

Related U.S. Application Data

(63) Continuation-in-part of application No. 12/271,760, filed on Nov. 14, 2008, now Pat. No. 7,911,619.

(60) Provisional application No. 60/988,404, filed on Nov. 15, 2007, provisional application No. 61/173,571, filed on Apr. 28, 2009.

(51) Int. Cl.
*G01C 19/72* (2006.01)
(52) U.S. Cl. ....................................................... 356/460
(58) Field of Classification Search .................. 356/459, 356/460, 461, 483
See application file for complete search history.

(56) References Cited

U.S. PATENT DOCUMENTS

| 4,469,397 | A | * | 9/1984 | Shaw et al. | ...................... 385/27 |
| 4,530,097 | A | | 7/1985 | Stokes et al. | |
| 4,708,480 | A | * | 11/1987 | Sasayama et al. | ............ 356/464 |
| 4,773,759 | A | | 9/1988 | Bergh et al. | |

(Continued)

FOREIGN PATENT DOCUMENTS

CA 2532247 7/2007

(Continued)

OTHER PUBLICATIONS

Dangui, . et al., "Phase sensitivity to temperature of the fundamental mode in air-guiding photonic-bandgap fibers," *Optics Express*, vol. 13, No. 18, 6669-6684 (Sep. 5, 2005).

(Continued)

*Primary Examiner* — Michael A Lyons
(74) *Attorney, Agent, or Firm* — Knobbe, Martens, Olson & Bear LLP

(57) ABSTRACT

A fiber-optic sensor, a method of configuring a fiber-optic sensor, and a method of using a fiber-optic sensor are provided. The fiber-optic sensor includes an optical fiber coil having a length and a laser source optically coupled to the coil. The laser source has a coherence length. Light from the source is transmitted to the coil as a first signal propagating along the coil in a first direction and a second signal propagating along the coil in a second direction opposite to the first direction. The optical paths of the first signal and the second signal are substantially reciprocal with one another and the first signal and the second signal are combined together after propagating through the coil to generate a third signal. The coherence length is greater than 1 meter or is in a range between 200 microns and 10 centimeters.

30 Claims, 9 Drawing Sheets

U.S. PATENT DOCUMENTS

| | | | |
|---|---|---|---|
| 5,153,676 A | 10/1992 | Bergh | |
| 5,530,545 A | 6/1996 | Pavlath | |
| 6,529,444 B2 * | 3/2003 | Vakoc | 367/149 |
| 7,911,619 B2 * | 3/2011 | Blin et al. | 356/460 |
| 2008/0030741 A1 | 2/2008 | Digonnet et al. | |
| 2008/0180681 A1 | 7/2008 | Digonnet | |

FOREIGN PATENT DOCUMENTS

| | | |
|---|---|---|
| WO | WO 92/11509 | 7/1992 |
| WO | WO 2007/076600 | 7/2007 |

OTHER PUBLICATIONS

Bergh et al., "All-single-mode fiberoptic gyroscope," Optics Letters, vol. 6, No. 4, pp. 198-200 (1981).

Bergh, R.A. et al., Compensation of the Optical Kerr Effect in Fiber-Optic Gyroscopes, *Optics Letters*, vol. 7, pp. 282-284 (1992).

Blin, S. et al., "Fiber optic gyroscope operated with a frequency-modulated laser," *Conf. on Optical Fiber Sensors*, Perth, Australia, *Proc. SPIE* vol. 7004, 70044X-1-4 (Apr. 2008).

Blin, S. et al., "Reduced thermal sensitivity of a fiber-optic gyroscope using an air-core photonic-bandgap fiber," *J. Lightwave Techn.*, vol. 25, No. 3, 861-865 (Mar. 2007).

Böhm et al., "Low-drift fibre gyro using a superluminescent diode," Electronics Letters 17(10), pp. 352-353, 1981.

Brinkmeyer, E., "Analysis of the backscattering method for singlemode fibers," *J. Opt. Soc. Am.* vol. 70, 1010-1012 (1980).

Culshaw et al., "Frequency modulated heterodyne optical fiber Sagnac interferometer," IEEE Trans. Microwave Theory and Techniques, Vo. MTT-30, No. 4, pp. 536-539 (1982).

Cutler et al., "Limitation of rotation sensing by scattering," Optics Letters 5(11), pp. 488-490, 1980.

Dangui, V., Doctorate Thesis, "Laser-Driven Air-Core Photonic-Bandgap Fiber Optic Gyroscope," Electrical Engineering Department, Stanford University, Oct. 2007.

Dangui, . et al., "Modeling of the propagation loss and backscattering in air-core photonic-bandgap fibers," *IEEE J. Lightwave Technol.* vol. 27, No. 17, 3783-3789 (Sep. 1, 2009).

Dangui, V. et al., "Laser-driven photonic-bandgap fiber optic gyroscope with negligible Kerr-induced drift," *Opt. Lett.*, vol. 34, No. 7, 875-877 (Apr. 2009).

Digonnet, M. et al., "Coherent Backscattering Noise in Photonic-Bandgap Fiber Optic Gyroscope," *International Conference on Optical Fiber Sensors*, Edinburgh, Scotland (Oct. 2009).

Giles, I.P. et al., "*Coherent backscatter-induced drift in phase-modulated optical fiber gyroscopes,*" Electron. Lett., vol. 22, No. 9, 494-496 (1986).

Gustavson et al., "Rotation sensing with a dual atom-interferometer Sagnac gyroscope," Class. Quantum Grav., 17, pp. 2385-2398, 2000.

Kim et al., "Fiber-optic gyroscope using an air-core photonic bandgap fiber," Proceedings of the SPIE 5855(1), pp. 198-201, 2005.

Kim, H.K., et al., "Air-core photonic-bandgap fiber gyroscope," *J. Lighwave Techn.*, vol. 24, No. 8, 3169-3174 (Aug. 2006).

Kråkenes et al., "Effect of Laser Phase Noise in Sagnac Interferometers," Journal of Lightwave Technology, vol. 11, No. 4, pp. 643-653, Apr. 1993.

Lefèvre, "The Fiber-Optic Gyroscope," pp. 30-43, Artech House, Inc., Norwood (MA), 1993.

Mackintosh, M. and Culshaw, B., "Analysis and observation of coupling ratio dependence of Rayleigh backscattering noise in a fiber optic gyroscope," *J. Lightwave Tech.*, vol. 7, No. 9, 1323-1328 (1989).

Mangan, B.J. et al., "Low loss (1.7 dB/km) hollow core photonic bandgap fiber," in*Proc. Opt. Fiber. Commun. Conf.* (2004), paper PDP24.

Moeller et al., "1.06-μm all-fiber gyroscope with noise subtraction," Optics Letters, vol. 16, No. 23, pp. 1902-1904 (1991).

Nakazawa, M. et. al, "Analyses of optical time-domain reflectometry for single-mode fibers and of polarization optical time-domain reflectometry for polarization-maintaining fibers," *Optics Letters*, vol. 8, No. 2, 130-132 (1983).

Post, "Sagnac effect," Reviews of Modern Physics, vol. 39, pp. 475-493, 1967.

Takada, K., "Calculation of Rayleigh backscattering noise in fiber-optic gyroscopes," *J. Opt. Soc. Am. A*, vol. 2, No. 6 (Jun. 1985).

Wegmuller, M. et al., "Experimental investigation of the polarization properties of a hollow core photonic bandgap fiber for 1550 nm," *Opt. Expr.*, vol. 13, No. 5, 1457-1467 (Mar. 2005).

Wen, H. et al., "Measurements of the birefringence and Verdet constant in an air-core fiber," *IEEE J. of Lightwave Technol.* vol. 27, No. 15, 3194-3201 (Aug. 2009).

Zheng, "All-fiber single-mode fiber frequency-modulated continuous-wave Sagnac gyroscope," Optics Letters 30, pp. 17-19, Jan. 2005.

Zheng, "Differential birefringent fiber frequency-modulated continuous-wave Sagnac gyroscope," IEEE Photonics Technology Letters, vol. 17, pp. 1498-1500, Jul. 2005.

International Search Report and Written Opinion for PCT/US2008/083699 mailed May 19, 2009.

International Preliminary Report on Patentability for PCT/US2008/083699 mailed Jun. 8, 2010.

Extended Search Report for European Patent Application No. 10250844.7 dated Apr. 24, 2012 in 7 pages.

* cited by examiner

LASER-DRIVEN OPTICAL GYROSCOPE HAVING A NON-NEGLIGIBLE SOURCE COHERENCE LENGTH

CROSS-REFERENCE TO RELATED APPLICATIONS

The present application claims the benefit of priority to U.S. Provisional Patent Application No. 61/173,571, filed Apr. 28, 2009, which is incorporated in its entirety by reference herein. The present application is a continuation-in-part of U.S. patent application Ser. No. 12/271,760, filed Nov. 14, 2008 and incorporated in its entirety by reference herein, which claims the benefit of priority to U.S. Provisional Patent Application No. 60/988,404, filed Nov. 15, 2007 and incorporated in its entirety by reference herein.

BACKGROUND

1. Field of the Invention

The present application relates generally to optical gyroscopes, and more specifically, to optical gyroscopes utilizing a laser source.

2. Description of the Related Art

First demonstrated in the 1970s, the fiber-optic gyroscope (FOG) is one of the oldest and most advanced fiber optic sensors. It has found many commercial and military applications. Part of this success is rooted in the Sagnac loop that it uses as the sensing element, a common-path interferometer that is inherently reciprocal and thus highly stable against most external perturbations. Another component of this success is the use of broadband light, for example from an Er-doped superfluorescent fiber source (SFS), to interrogate the interferometer. Incoherent light was shown very early on to essentially eliminate two deleterious effects that occur in the fiber loop, namely a non-reciprocal phase drift induced by the nonlinear Kerr effect and noise and long-term phase drift caused by coherent backscattering. See, e.g., H. C. Lefevre, *The Fiber-Optic Gyroscope*, Artech House, Boston (1993).

Unfortunately, the adoption of a broadband source introduced two limitations. First, the noise of a broadband source (excess noise) typically far exceeds shot noise, and it limits the FOG's minimum detectable rotation rate. Second, the scale factor of a FOG, which relates the measured gyroscope signal to the rotation rate, must be extremely stable (~1 part per million) for aircraft inertial navigation applications. Consequently, the mean wavelength of the light must have a comparable stability, which is difficult to achieve in practice with a broadband source.

SUMMARY

In certain embodiments, a fiber-optic sensor comprises an optical fiber coil having a length and a laser source optically coupled to the coil. The laser source has a coherence length. Light from the source is transmitted to the coil as a first signal propagating along the coil in a first direction and a second signal propagating along the coil in a second direction opposite to the first direction. The optical paths of the first signal and the second signal are substantially reciprocal with one another and the first signal and the second signal are combined together after propagating through the coil to generate a third signal. The coherence length is greater than 1 meter or is in a range between 200 microns and 10 centimeters.

In certain such embodiments, the coherence length is in a range between 100 microns and 10 centimeters, in a range between 100 microns and 5 centimeters, in a range between 100 microns and 1 centimeter, in a range between 200 microns and 10 centimeters, in a range between 200 microns and 5 centimeters, in a range between 200 microns and 1 centimeter, in a range between 500 microns and 10 centimeters, in a range between 500 microns and 5 centimeters, in a range between 500 microns and 1 centimeter, in a range between 1 millimeter and 10 centimeters, in a range between 1 millimeter and 5 centimeters, in a range between 1 millimeter and 1 centimeter, in a range between 1 centimeter and 10 centimeters, in a range between 1 centimeter and 5 centimeters, greater than 1 meter, in a range between 1 meter and 1 kilometer, in a range between 1 meter and 500 meters, in a range between 1 meter and 100 meters, in a range between 10 meters and 100 meters, in a range between 10 meters and 500 meters, in a range between 10 meters and 1 kilometer, in a range between 100 meters and 500 meters, in a range between 100 meters and 1 kilometer, in a range between 100 meters and 10 kilometers, in a range between 1 kilometer and 10 kilometers, in a range between 10 kilometers and 100 kilometers, or in a range between 1 kilometer and 100 kilometers. In certain such embodiments, the coherence length is less than or equal to the length of the coil 20, while in certain other embodiments, the coherence length is greater than the length of the coil 20. The coherence length is selected in certain such embodiments to provide a noise level below a desired level, and the selection of the coherence length is based on calculations as described more fully herein.

In certain embodiments, the coherence length is less than the length. In certain embodiments, the sensor has a phase noise which varies as a function of coherence length, the phase noise having a peak value at a predetermined value of coherence length, wherein the phase noise for the coherence length is at least a factor of two less than the peak value of the phase noise. In certain embodiments, the sensor has a phase noise which varies as a function of coherence length, the phase noise having a peak value at a predetermined value of coherence length, wherein the coherence length of the laser source is less than the predetermined value. In certain embodiments, the sensor has a phase noise which varies as a function of coherence length, wherein the coherence length results in a phase noise less than about 2 μrad/√Hz, less than about 1 μrad/√Hz, or less than about 0.5 μrad/√Hz.

In certain embodiments, the first signal and the second signal have the same frequency as the light from the laser source. In certain embodiments, the laser source has a mean wavelength stability greater than 1 part per million. In certain embodiments, the sensor is a fiber-optic gyroscope comprising a standard Sagnac loop which comprises the coil.

In certain embodiments, a method of operating a fiber-optic sensor is provided. The method comprises providing a fiber-optic sensor comprising an optical fiber coil having a length and a laser source optically coupled to the coil. The laser source has a coherence length such that the sensor has a phase noise below a predetermined value. The coherence length is less than the length. The method further comprises stabilizing a DC offset of the sensor. The method further comprises transmitting light from the source to the coil as a first signal and a second signal. The first signal propagates along the coil in a first direction and the second signal propagates along the coil in a second direction opposite to the first direction. The optical paths of the first signal and the second signal are substantially reciprocal with one another. The method further comprises combining the first signal and the second signal together to generate a third signal.

In certain embodiments, a ratio of the coherence length to the length of the coil is greater than 0.1. In certain embodiments, the coherence length is greater than 1 meter or is in a range between 200 microns and 10 centimeters.

In certain embodiments, a method of configuring a fiber-optic sensor is provided. The method comprises providing a fiber-optic sensor comprising a laser source and an optical fiber coil having a length. The coil is optically coupled to the laser source such that light from the laser source is transmitted to the coil as a first signal propagating along the coil in a first direction and a second signal propagating along the coil in a second direction opposite to the first direction. The optical paths of the first signal and the second signal are substantially reciprocal with one another and the first signal and the second signal are combined together after propagating through the coil to generate a third signal. The sensor has a phase noise which varies as a function of coherence length of the laser source. The method further comprises selecting the laser source to have a coherence length such that the sensor has a phase noise less than a phase noise resulting when the sensor is driven by a broadband source.

In certain embodiments, the coherence length is less than the length. In certain embodiments, a ratio of the coherence length to the length of the coil is greater than 0.1. In certain embodiments, the coherence length is greater than 1 meter or is in a range between 200 microns and 10 centimeters. In certain embodiments, the predetermined value is less than about 2 μrad/√Hz, less than about 1 μrad/√Hz, or less than about 0.5 μrad/√Hz. In certain embodiments, the first signal and the second signal have the same frequency as the light from the laser source.

DETAILED DESCRIPTION

Figure 1A:
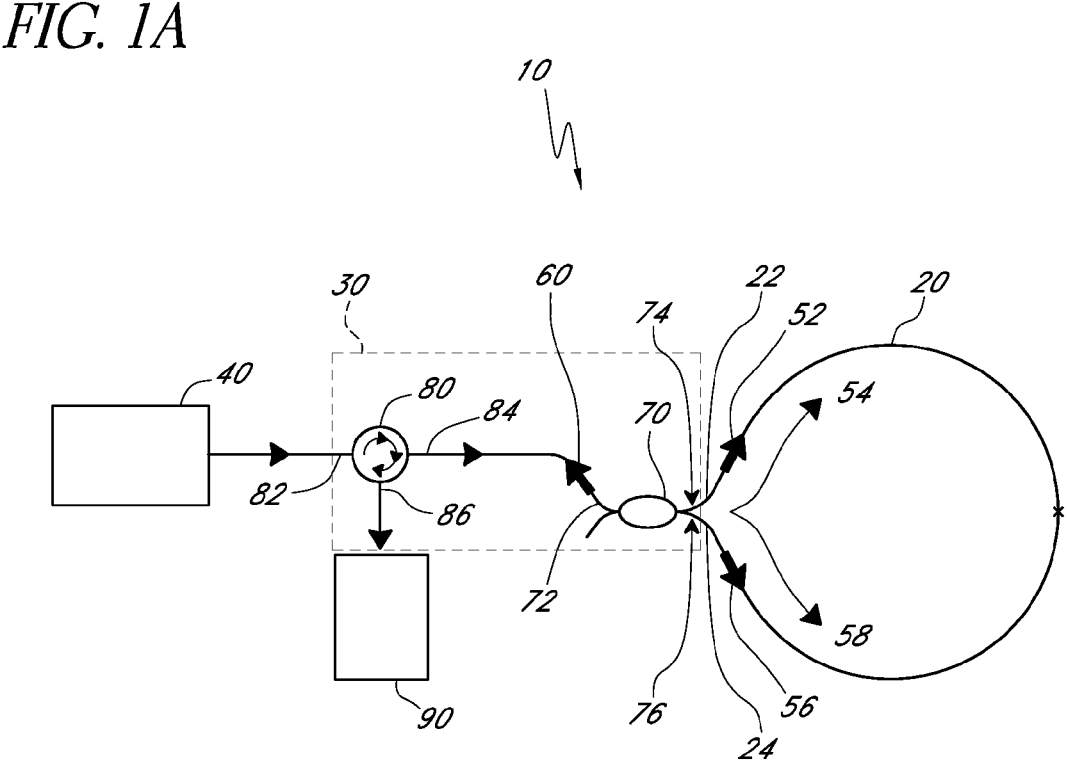
FIGS. 1A-1E schematically illustrate example fiber-optic sensors in accordance with certain embodiments described herein.

Simulations and experiment show that when the coherence length of a laser exceeds the length of the fiber loop in a fiber optic gyroscope (FOG), the noise due to coherent backscattering decreases. When the coherence length is long enough, a gyroscope in accordance with certain embodiments described herein can have substantially the same sensitivity as the same gyroscope driven with a conventional broadband source. One example of a laser source for certain embodiments described herein is a semiconductor laser. A particularly good wavelength range for the laser is around 1.5 μm, because it coincides with the lowest loss of the silica-based fibers used in the gyroscope's sensing coil, but laser sources with other wavelengths are also compatible with certain embodiments described herein. A distributed-feedback (DFB) laser is a good candidate, although any semiconductor laser with an appropriately narrow linewidth and a stable enough frequency is applicable in certain embodiments. The InGaAsP semiconductor lasers around 1.5 μm developed for the optical telecom industry are excellent candidates, because in order to meet the telecom requirements they have been engineered to be ultra-stable and single-frequency, as well as mechanically robust. Furthermore, by applying other noise reduction schemes, for example modulation of the laser frequency (a scheme described in U.S. patent application Ser. No. 12/271,760, which is incorporated in its entirety by reference herein), it is possible in certain embodiments to reduce the coherent backscattering noise below that of a conventional FOG driven with a broadband source. The noise of a gyroscope in accordance with certain embodiments described herein is then limited by shot noise.

This scheme has several advantages. First, a laser has a much more stable frequency than does a broadband source. Hence, when using a laser, the scale factor stability of a gyroscope in accordance with certain embodiments described herein is enhanced. This stability is particularly important for certain inertial navigation applications of a gyroscope, which require a high stability of the scale factor over many hours. Second, for a given input electrical power, a semiconductor laser produces a higher output power than does a broadband source. Consequently, for the same input power, a laser-driven gyroscope in accordance with certain embodiments described herein has a higher output power at the detector (which means lower detection noise). Alternatively, for the same detected power, a gyroscope in accordance with certain embodiments described herein has a lower electrical power requirement. Either case is desirable in certain embodiments. Third, because the signal-to-noise ratio of a shot-noise-limited signal increases as the power increases, the total noise of a laser-driven gyroscope in accordance with certain embodiments described herein can be reduced significantly by increasing the detected power, e.g., by increasing the laser power. This means that the sensitivity to rotation of a gyroscope in accordance with certain embodiments described herein can be increased by increasing the laser power. This is not true in a conventional gyroscope driven by a broadband source, because the noise in the broadband detected signal is ultimately (e.g., at high enough detected power) limited by excess noise associated with the broadband nature of the light, and in this case it is well known that the angular random walk in the detected signal is independent of detected power, e.g., it does not improve with increased detected power.

The fact that the noise due to coherent backscattering decreases when the coherence length of the source exceeds the fiber loop length has been reported in M. Digonnet, S. Lloyd; and S. Fan, "Coherent Backscattering Noise in Photonic-Bandgap Fiber Optic Gyroscope," *International Conference on Optical Fiber Sensors*, Edinburgh, Scotland (October 2009), which is incorporated in its entirety by reference herein. Since the early years of the gyroscope, when the deleterious effects of coherent backscattering were first demonstrated, it has been assumed that as the coherence length of a laser approaches the length of the loop, the noise level reaches a maximum, and further increasing the coherence length beyond the loop length does not modify it. The rationale was that when the coherence length equals the loop length, all the scatterers present in the sensing fiber contribute to noise, and the noise could not worsen or improve by increasing the coherence length. The argument was fallacious because it fails to take into account the noise property of the source. As the coherence length of a laser increases, its phase noise also decreases. This phase noise is at the root of the coherent backscattering noise: it is the randomness in the phase of the photons incident on the backscatterers that spell out the magnitude of the noise, not some random phase acquired by backscattered photons at the backscatterers. In work by our research group, this point was first demonstrated through numerical simulations and has subsequently been demonstrated experimentally in a fiber optic gyroscope utilizing a conventional index-guiding fiber. This principle is, however, very broad. It is applicable for any kind of fiber, including photonic-bandgap fibers (PBF), microstructured fibers with a solid core and holey cladding, etc. It is also applicable for other forms of waveguides besides fiber.

As mentioned above, certain embodiments described herein can utilize a PBF. The advantages of using a PBF in the sensing loop of a FOG can be found for example in H. K. Kim, M. J. F. Digonnet, and G. S. Kino, "Air-core photonic-bandgap fiber gyroscope," *J. Lighwave Techn.*, Vol. 24, No. 8, 3169-3174 (August 2006). This fundamental change has several major benefits, all of which stem from the fact that in a PBF, light travels mostly in air. First, air has a much weaker Kerr constant than silica, so the Kerr-induced drift should be very small, even if a laser is used as a light source. Second, because air scatters much less than silica, coherent-scattering noise in a PBF should ultimately be manageable, provided backscattering due to random variations in the fiber cross section can be kept to a low enough level. As a result of these two improvements, the use of a laser instead of an SFS is an appealing new possibility in an air-core FOG. Reverting to a laser has several key advantages, as explained above, including elimination of excess noise and thus increased sensitivity to rotation, far greater mean-wavelength stability, and reduced electrical power consumption and size. Third, air has a much weaker refractive index dependence on temperature than silica. Consequently, the well-known and troublesome long-term drift due to asymmetric, time-varying temperature gradients along the sensing coil (known as the Shupe effect) is reduced. This is important because even though the Shupe effect is mitigated in practical gyroscopes by special windings (e.g., quadrupolar) of the fiber loop, it is not completely gone, and the residual drift is often too large for high-end applications. Fourth, the Faraday constant is much weaker in air than in silica. The signal drift induced by the Earth's magnetic field acting on the coil is therefore significantly reduced, as can be inferred from a measurement of the Verdet constant of an air-core fiber (see H. Wen, M. A. Terrel, H. K. Kim, M. J. F. Digonnet, S. Fan, and G. S. Kino, "Measurements of the birefringence and Verdet constant in an air-core fiber," *IEEE J. of Lightwave Technol.* Vol. 27, No. 15, 3194-3201 (August 2009)). This should reduce the amount of mu-metal shielding of the fiber coil, which results in a cost, space, and weight saving.

Several of these improvements have been demonstrated experimentally. In a PBF FOG prototype operated with a narrowband laser, our research group measured a 6.5-fold reduction in thermal drift, in agreement with theory. See S. Blin, H. K. Kim, M. J. F. Digonnet, and G. S. Kino, "Reduced thermal sensitivity of a fiber-optic gyroscope using an air-core photonic-bandgap fiber," *J Lightwave Techn.*, Vol. 25, No. 3, 861-865 (March 2007). With straightforward fiber design improvements, this figure could be increased to a factor of ~23. In the same gyroscope, a 250-fold reduction in the effective Kerr constant over a conventional FOG ($4.4 \times 10^{-3}$ vs. 1.1 rad/W/km) was also measured, in good accord with theory. See V. Dangui, M. J. F. Digonnet, and G. S. Kino, "Laser-driven photonic-bandgap fiber optic gyroscope with negligible Kerr-induced drift," *Opt. Lett.*, Vol. 34, No. 7, 875-877 (April 2009). This has led to the demonstration of a laser-driven air-core FOG with an inferred Kerr-induced long-term drift low enough to meet the requirement for a 10-h flight. A reduction in the Faraday constant of a factor of 90 compared to a conventional fiber was also measured. See H. Wen, M. Terrel, M. J. F. Digonnet, and S. Fan, cited previously.

FIG. 1A schematically illustrates an example fiber-optic sensor 10 in accordance with certain embodiments described herein. The sensor 10 comprises an optical fiber coil 20 and at least one optical coupler 30 optically coupled to the coil 20. The sensor 10 further comprises a laser, source 40 optically coupled to the at least one optical coupler 30. Light from the laser source 40 is transmitted by the at least one optical coupler 30 to the coil 20 as a first signal 52 propagating along the coil 20 in a first direction 54 and a second signal 56 propagating along the coil 20 in a second direction 58 opposite to the first direction 54. The optical paths of the first signal 52 and the second signal 56 are substantially reciprocal with one another and the first signal 52 and the second signal 56 are combined together by the at least one optical coupler 30 to generate a third signal 60. In certain embodiments, the laser source 40 has a coherence length in accordance with the discussion below.

In certain embodiments, the fiber-optic sensor 10 is a Sagnac-based fiber-optic sensor, as schematically illustrated by FIG. 1A. The sensor 10 of certain embodiments is a FOG that is sensitive to rotations of the coil 20 (e.g., the power carried by the third signal 60 changes as the rate of rotation (e.g., in degrees per hour) applied to the coil 20 varies). In certain other embodiments, the sensor 10 is configured to be sensitive to one or more other perturbations, including but not limited to, acoustic, thermal, and magnetic perturbations. The sensor 10 of certain embodiments thereby provides for detection of one or more of the following: rotational movements, acoustic fields, thermal transients, and magnetic fields. The sensor 10 of certain embodiments is configured to be used for one or more purposes, including but not limited to, as a compass, as a gyrocompass, and as a motion sensor. Persons skilled in the art will recognize that while the majority of the discussion below is presented with regard to FOGs, other fiber-optic sensors are also compatible with certain embodiments described herein.

The coil 20 of certain embodiments comprises a plurality of substantially concentric loops. In certain embodiments, the coil 20 comprises a conventional optical fiber (e.g., a single-mode fiber such as the SMF-28® optical fiber available from Corning, Inc. of Corning, N.Y.). In certain other embodiments, the coil 20 comprises an air-core optical fiber (e.g., a hollow-core photonic-bandgap fiber such as the 7-cell HC-1550-02 optical fiber available from Crystal Fibre A/S of Birkerød, Denmark). In certain embodiments, the air-core optical fiber advantageously provides a reduction of one or more of the Kerr effect, the Faraday effect, and the Shupe (thermal) effect, as compared to conventional optical fibers. See, e.g., U.S. Pat. Appl. Publ. No. 2008/0030741 A1 and H. K. Kim, V. Dangui, M. Digonnet, and G. Kino, "Fiber-optic gyroscope using an air-core photonic-bandgap fiber," Proceedings of the SPIE, vol. 5855, no. 1, pp. 198-201 (2005), each of which is incorporated in its entirety by reference herein. However, the backscattering coefficient of existing air-core optical fibers is actually higher than that in conventional solid-core optical fibers (by up to about one order of magnitude), thereby severely limiting the sensitivity of a laser-driven air-core fiber-optic sensor (e.g., FOG).

If the Kerr effect is still too large and thus introduces a detrimental phase drift that degrades the performance of the fiber optical system, other methods can also be employed to reduce the Kerr effect in a fiber optic system implemented in a Sagnac interferometer including a narrowband source comprising a light-emitting device in combination with an amplitude modulator. The optical signal from the light-emitting device is modulated by the amplitude modulator. In certain embodiments, the amplitude modulator produces a square-wave modulation, and in certain embodiments, the resulting light output from the narrowband source has a modulation duty cycle of about 50%. The modulation is maintained in certain embodiments at a sufficiently stable duty cycle. As discussed, for example, in U.S. Pat. No. 4,773,759, and in R. A. Bergh et al., *Compensation of the Optical Kerr Effect in Fiber-Optic Gyroscopes, Optics Letters*, Vol. 7, 1992, pages 282-284, such square-wave modulation effectively cancels the Kerr effect in a fiber-optic gyroscope.

However, with straightforward technical improvements, air-core optical fibers can have a dramatically reduced backscattering level which is much lower than prevails in current air-core fibers. For example, one method for reducing backscattering of an air-core optical fiber is to increase the diameter of the fiber core, e.g., by removing 19 tubes from the fiber preform to form the core, rather than 7 as is done for most current air-core optical fibers. A second method includes designing the fiber such that it has a wider bandgap. This can be accomplished, for example, by increasing the fiber's air-filling ratio. A third approach for reducing the level of backscattering is to increase the speed at which the fibers are drawn, which in itself requires adjusting other fabrication and preform parameters, such as the temperature of the melt zone, the pressure of the gas applied to the preform's tubes, the viscosity and/or composition of the glass, etc. These methods of reducing backscattering in an air-core optical fiber, and their physical origin and mathematical justifications (in some cases), can be found in Vinayak Dangui's Doctorate Thesis, *Laser-Driven Air-Core Photonic-Bandgap Fiber Optic Gyroscope*, Electrical Engineering Department, Stanford University, October 2007, in particular in Section 5.3.7, which is incorporated in its entirety by reference herein. Other optical fibers are also compatible with various embodiments described herein.

In certain embodiments, as schematically illustrated by FIG. 1A, the at least one optical coupler 30 comprises a first optical coupler 70 comprising a first port 72, a second port 74, and a third port 76. For example, the first optical coupler 70 can comprise a 3-dB optical coupler, as schematically illustrated in FIG. 1A. The first optical coupler 70 of certain embodiments comprises additional ports. In certain embodiments, the second port 74 is optically coupled to a first end 22 of the coil 20 and the third port 76 is optically coupled to a second end 24 of the coil 20, as schematically illustrated by FIG. 1A. Light generated by the laser source 40 received at the first port 72 is split into the first signal 52 and the second signal 56. The first signal 52 is transmitted by the second port 74 to the first end 22 of the coil 20 to propagate in the first direction 54 (e.g., clockwise) along the coil 20, and is transmitted by the second end 24 of the coil 20 and the third port 76 to the first port 72. The second signal 56 is transmitted by the third port 76 to the second end 24 of the coil 20 to propagate in the second direction 58 (e.g., counterclockwise) along the coil 20, and is transmitted by the first end 22 of the coil 20 and the second port 74 to the first port 72. Thus, the first signal 52 and the second signal 56 counterpropagate through the coil 20 and are recombined together by the first optical coupler 70.

In such a configuration, the optical paths of the first signal 52 and the second signal 56 are substantially reciprocal with one another. The term "reciprocal" as used herein includes its broadest reasonable interpretation, including, but not limited to, optical paths which have substantially the same optical length and which have substantially equal responses to perturbations (e.g., thermal variations). For example, for light traveling from a first state ("state" including polarization state, phase, but not amplitude) at point A to a second state at point B, light propagation is reciprocal if upon reversing the direction of light at point B, the light (now starting in the second state at point B) gets back to point A again in the first state. For certain embodiments described herein, because the two signals 52, 56 travel along the same optical path, their propagation is basically or substantially reciprocal such that the phase accumulated by the first signal 52 as it travels around the entire coil 20 in one direction is equal to the phase accumulated by the second signal 56 as it travels around the entire coil 20 in the opposite direction. This reciprocity would be absolute in the absence of nature's very few non-reciprocal effects, such as the Faraday effect (resulting from exposure to a magnetic field) and the Sagnac effect (resulting from exposure to a rotation), and in the absence of asymmetric time-dependent effects (such as dynamic perturbations, e.g., pressure or temperature variations), applied asymmetrically to any fraction or all of the sensing coil 20. However, this reciprocity is not absolute unless nonreciprocal effects are all exactly zero, which means, in particular, that the two signals 52, 56 must be in the same state of polarization (SOP) at every point along the coil 20 (although the SOP of each signal does not have to be the same at every point along the coil 20). In this context, the term "substantially reciprocal" recognizes that canceling these residual non-reciprocal effects is never complete. Examples of systems comprising substantially reciprocal optical paths include, but are not limited to, common-path interferometers and common-mode interferometers. Examples of non-reciprocal optical paths are found in J. Zheng, "*All-fiber single-mode fiber frequency-modulated continuous-wave Sagnac gyroscope*," Optics Letters, Vol. 30, pp. 17-19 (2005) which discloses an unbalanced interferometer.

In certain embodiments, as schematically illustrated by FIG. 1A, the at least one optical coupler 30 further comprises a second optical coupler 80 comprising a first port 82, a second port 84, and a third port 86. The second optical coupler 80 of certain embodiments comprises additional ports. For example, the second optical coupler 80 can comprise an optical circulator, as schematically illustrated by FIG. 1A. In certain embodiments, the first port 82 receives light generated by the laser source 40 (e.g., the first port 82 is optically coupled to the laser source 40), the second port 84 is optically coupled to the first port 72 of the first optical coupler 70, and the third port 86 is optically coupled to a detection system 90. Light received by the first port 82 from the laser source 40 is transmitted through the second port 84 to the first port 72 of the first optical coupler 70. Light (e.g., the third signal 60) received by the second port 84 from the first port 72 of the first optical coupler 70 is transmitted through the third port 86 to the detection system 90. Other configurations of the at least one optical coupler 30 are also compatible with certain embodiments described herein. For example, the at least one optical coupler 30 can comprise additional or fewer optical elements, and the second optical coupler 80 can comprise a 3-dB optical coupler. As described more fully below, in certain embodiments, the sensor 10 can comprise a polarizer which can be used advantageously to achieve polarization reciprocity.

When the coil 20 is not rotated, the first signal 52 and the second signal 56 returning to the first port 72 after propagating through the common-path interferometer formed by the coil 20 and the first coupler 70 are recombined in phase. If a dynamic perturbation is applied to the coil 20 anywhere but in the mid-point of the coil 20 (identified by a small cross on the coil 20 of FIG. 1A), the counterpropagating first signal 52 and second signal 56 experience a phase differential. When the two signals 52, 56 are recombined by the at least one optical coupler 30 at the port 72, this phase differential results in an amplitude differential in the third signal 60 at the port 72, which is detected by the detector system 90. This amplitude differential contains the information about the perturbation. A rotation of the coil 20 also induces a phase shift whose amplitude is proportional to the rotation rate. When the sensor 10 is not perturbed (e.g., when the FOG is without rotation), the signal returning from an ideal FOG contains spectral components at even multiples of the modulation frequency (dc included), but does not return any signal at $f_0$. However, any perturbation, including backscattering noise, will induce a component at $f_0$. Thus, the signal of interest in certain embodiments is modulated at $f_0$.

In certain embodiments, the laser source 40 has a mean wavelength in a range between about 1.48 μm and about 1.6 μm (e.g., about 1.5 μm), while other wavelengths are also compatible with certain embodiments described herein. The mean wavelength of the laser source 40 of certain embodiments is stable to within about one part per million or better. The greater stability of the mean wavelength of certain embodiments, as compared to an SFS, advantageously provides a greater scale-factor stability for the FOG.

In certain embodiments, as described more fully below, the laser source 40 comprises a laser having a narrow bandwidth such that its coherence length is greater than the optical length of the coil 20 (e.g., in a range from hundreds of meters to thousands of kilometers), equal to the optical length of the coil 20 (e.g., a few hundred meters or longer), or less than the optical length of the coil 20 but considerably longer than the coherence length of a broadband source (which for a typical SFS is tens of microns).

The term "coherence length" as used herein has its broadest reasonable interpretation, including but not limited to, the coherence length in the material in which the light substantially propagates within the fiber coil. The term "ratio of coherence length to length of the coil" as used herein has its broadest reasonable interpretation, including but not limited to, the coherence length in the material in which the light substantially propagates within the fiber coil divided by the physical length of the fiber of the coil. For example, in the context of an air-core fiber, unless otherwise specified, the coherence length is defined as the coherence length measured in air, and the ratio of coherence length to length of the coil is defined as the coherence length measured in air divided by the physical length of the fiber of the coil. For another example, in the context of a conventional solid-core fiber, unless otherwise specified, the coherence length is defined as the coherence length measured in the material of which the fiber is made (e.g., silica for a conventional solid-core fiber), and the ratio of coherence length to length of the coil is defined as the coherence length measured in the material of which the fiber is made (e.g., silica) divided by the physical length of the fiber of the coil.

In certain embodiments in which the coherence length is greater than or equal to the length of the coil 20, the ratio of the coherence length to the length of the coil 20 is greater than 1, greater than 1.1, greater than 1.5, greater than 2, greater than 5, greater than 10, greater than 100, or greater than 1000. In principle, the coherence length of the source in certain embodiments can be selected to be as long as possible to reduce the backscattering noise as much as possible. For example, referring to FIG. 4, described more fully below, increasing the coherence length beyond the value corresponding to the peak or maximum coherent backscattering noise will result in a reduction of the coherent backscattering noise from its peak value. In certain embodiments, the reduction is roughly linear on a log-log scale, and the net noise reduction can be characterized by a factor of ten every time the coherence length is increased by a factor of 200. In certain embodiments, however, it can be sufficient to reduce the backscattering noise to just below the next dominant source of noise, for example shot noise.

In certain embodiments in which the coherence length is less than or equal to the length of the coil 20, the ratio of the coherence length to the length of the coil 20 is greater than 0.00001, greater than 0.00005, greater than 0.0001, greater than 0.0005, greater than 0.001, greater than 0.005, greater than 0.01, greater than 0.05, greater than 0.1, in a range between 0.1 and 1, in a range between 0.3 and 1, or in a range between 0.5 and 1. In certain embodiments, the ratio of the coherence length to the length of the coil 20 is in a range between 0.5 and 1.5.

In certain embodiments, the coherence length is in a range between 100 microns and 10 centimeters, in a range between 100 microns and 5 centimeters, in a range between 100 microns and 1 centimeter, in a range between 200 microns and 10 centimeters, in a range between 200 microns and 5 centimeters, in a range between 200 microns and 1 centimeter, in a range between 500 microns and 10 centimeters, in a range between 500 microns and 5 centimeters, in a range between 500 microns and 1 centimeter, in a range between 1 millimeter and 10 centimeters, in a range between 1 millimeter and 5 centimeters, in a range between 1 millimeter and 1 centimeter, in a range between 1 centimeter and 10 centimeters, in a range between 1 centimeter and 5 centimeters, greater than 1 meter, in a range between 1 meter and 1 kilometer, in a range between 1 meter and 500 meters, in a range between 1 meter and 100 meters, in a range between 10 meters and 100 meters, in a range between 10 meters and 500 meters, in a range between 10 meters and 1 kilometer, in a range between 100 meters and 500 meters, in a range between 100 meters and 1 kilometer, in a range between 100 meters and 10 kilometers, in a range between 1 kilometer and 10 kilometers, in a range between 10 kilometers and 100 kilometers, or in a range between 1 kilometer and 100 kilometers. In certain such embodiments, the coherence length is less than or equal to the length of the coil 20, while in certain other embodiments, the coherence length is greater than the length of the coil 20. The coherence length is selected in certain such embodiments to provide a noise level below a desired level, and the selection of the coherence length is based on calculations as described more fully below.

In certain embodiments, the bandwidth of the laser source 40 is sufficiently narrow such that the sensor 10 is substantially free from excess noise due to beating between the spectral components of the laser source 40 (e.g., the excess noise is below the shot noise of the detected signal). Examples of lasers compatible with certain embodiments described herein include, but are not limited to, external-cavity semiconductor diode lasers and distributed feedback fiber lasers. In certain embodiments, the distributed-feedback fiber laser is more suitable since it is more compact and robust than an external-cavity semiconductor diode laser. In certain embodiments, the laser frequency is modulated in some pattern (e.g., sinusoidal, saw-tooth, etc.) at a selected frequency $f_m$, as described in U.S. patent application Ser. No. 12/271,760, entitled "Low-Noise Fiber-Optic Sensor Utilizing a Laser Source," filed on Nov. 14, 2008, and incorporated in its entirety by reference herein. In certain such embodiments, the frequency modulation is selected to provide a reduction of the excess noise (and thus improved sensitivity, e.g. to rotation for a FOG) and in certain embodiments, to provide a reduction of the backscattered noise.

Coherent backscattering due to the interaction between light and inhomogeneities in the local index of refraction of a medium is known to be a primary noise source in a variety of Sagnac interferometer-based sensors such as fiber optic gyroscopes, acoustic sensors, etc. When light encounters such a local inhomogeneity, it is scattered in various directions. The portion of the scattered light in the reverse direction that is within the acceptance cone of the fiber will couple into the reverse propagating mode. Upon exiting the coil, this light will interfere with each of the primary waves, producing an error signal. The optical paths of the scattered light and the primary light are no longer reciprocal, so that local variations in the fiber propagation constant due to temperature transients or fluctuating magnetic fields, as well as phase fluctuations in the source will cause the error signal due to backscattering to fluctuate in time when the interference that occurs is coherent. The root mean square (RMS) fluctuations in this error signal limit the minimum sensitivity of Sagnac-loop-based sensors such as the FOG. In the case of the FOG, this type of noise is often characterized by the FOG random walk, given in units of deg/√hr.

Figure 1B:
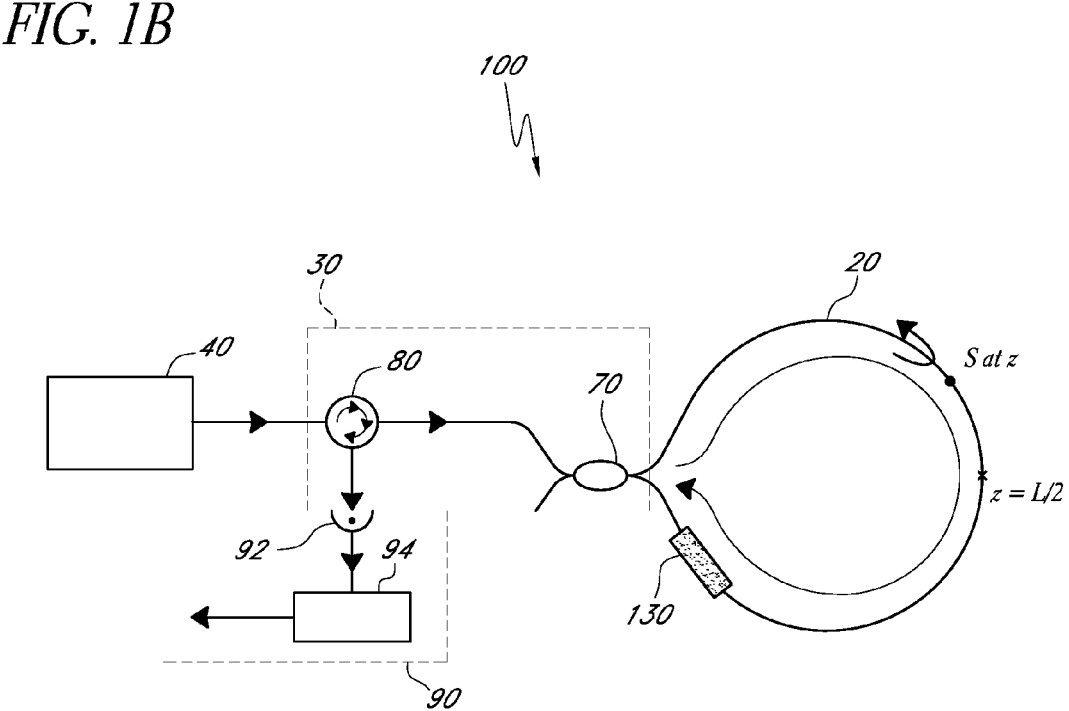

FIG. 1B schematically illustrates a single scatterer S at a position z in the optical fiber coil 20 of a Sagnac fiber-optic sensor 100 in accordance with certain embodiments described herein. The coil 20 schematically illustrated by FIG. 1B includes a phase modulator 130, as described more fully below. The sensor 100 also comprises a detector 90 comprising a photodiode 92 and detector circuitry 94. Person skilled in the art are able to provide a detector 90 compatible with certain embodiments described herein. In certain embodiments, the phase modulator 130 biases the interferometer in quadrature, as described in H. C. Lefevre, "*The Fiber-Optic Gyroscope*," Artech House, Inc., Norwood, Mass. (1993). The sensor 100 of FIG. 1B is an example of a fiber-optic gyroscope comprising a standard Sagnac loop, which comprises a coil 20 closed upon itself by an optical coupler, e.g., a 3-dB fiber coupler. In certain embodiments, the period of the phase modulation by the phase modulator 130 is twice the time-of-flight in the coil 20, and the frequency of this phase modulation is referred to as the proper frequency $f_0$ of the sensor 100. In certain embodiments, the modulation frequency of the phase modulator 130 is equal to the proper frequency $f_0$ of the coil 20. This selection of frequency has a number of advantageous benefits, including maximizing the sensitivity of the FOG to rotation, as described by H. C. Lefevre, cited above. Another beneficial effect of this phase modulation is that when the coil 20 is rotated, the interference signal caused by this rotation at the output of the coil 20 is centered at frequency $f_0$.

Backscattering noise arises from the interaction at the detector of the first signal 52 and the generally weaker signal generated by backscattering of the second signal 56 off scatterers (e.g., the scatterer S at position z). The small amount of backscattered light travels back to the at least one optical coupler 30, where it interferes with the first signal 52, thus generating noise on the first signal 52 (due to the random character of both the phase of the photons in the first signal 52 and the phase and amplitude of the reflection off the scatterer). Since in this direction, by the time they interact both the first signal 52 and the backscattered signal have traveled through the phase modulator 130, the spurious signal resulting from their interference occurs at frequency $f_0$. Since the rotation-induced signal on the FOG output signal also occurs at $f_0$ (see, H. C. Lefèvre, cited above), this spurious signal is indistinguishable from the rotation signal of the FOG, and it therefore constitutes a source of error. In the opposite direction, the main difference, in the example sensor 100 of FIG. 1B, is that by the time the second signal 56 and the backscattered signal due to backscattering of the first signal 52 off scatterers interact, only the second signal 56 has traveled through the phase modulator 130. The reason is two fold. First, the backscattered signal was generated from the first signal 52 backscattering from the scatterer at position z, which occurs at a time when the first signal 52 had not yet traveled through the phase modulator 130 and thus had not yet been modulated. Second, because this particular backscattered signal travels counterclockwise, it also never travels through the phase modulator 130. As a result, in this particular configuration, the second signal 56 does not carry any coherent backscattering noise at $f_0$.

Because this interference process between main and backscattered signals is coherent, only scatterers located along a segment of the coil 20 centered on the coil's midpoint and along a length of the coil 20 approximately equal to the coherence length of the source 40 contribute to the coherent backscattering. The scatterers located along the rest of the coil 20 produce a backscattered signal that is not temporally coherent with the main signal, thereby producing intensity noise, instead of phase noise. This noise is considerably weaker than coherent backscattering noise. In a Sagnac interferometer utilizing a broadband source, which has a short coherence length (typically tens of microns), the coherent backscattering noise is therefore very weak. As pointed out earlier, when such a source is used, the dominant noise of source is typically excess noise, not backscattering noise. On the other hand, utilizing a narrow-bandwidth laser source instead of a broadband source can result in dramatically enhanced noise due to the greater portion of the optical fiber coil 20 that produces coherent backscattering noise, because the coherence length of the laser source (typically 1 cm or longer, and usually much longer, up to thousands of km) is considerably longer than that of a broadband source. The coherence length of the laser source can be typically a fraction of the length of the optical fiber coil 20 (e.g., 0.1% of the length of the coil 20, which can be a few hundred meters or longer) or longer. Therefore, all the scatterers along the optical fiber coil 20 contribute to the coherent backscattering noise. In certain embodiments, this backscattering noise is advantageously reduced by sweeping or modulating the frequency of the laser source 40 and filtering the detected signal, as described in U.S. patent application Ser. No. 12/271,760, entitled "Low-Noise Fiber-Optic Sensor Utilizing a Laser Source," filed on Nov. 14, 2008, and incorporated in its entirety by reference herein. The purpose of the polarization controller 120 in certain embodiments is to control the birefringence of the coil 20 and to ensure that the state of polarization of the signal output by the coil 20 is aligned with respect to the polarizer transmission axis. This has two effects: (i) it maximizes the optical power transmitted by the polarizer 110 back to the optical circulator 80 and the photodiode 92; and (ii) it ensures that the two signals counterpropagating through the coil 20 have the same state of polarization (SOP) at every point (although again, the SOP of each signal may not be the same at every point along the loop). As discussed above, this can advantageously be used to ensure substantial reciprocity of the Sagnac interferometer.

Figure 1C:
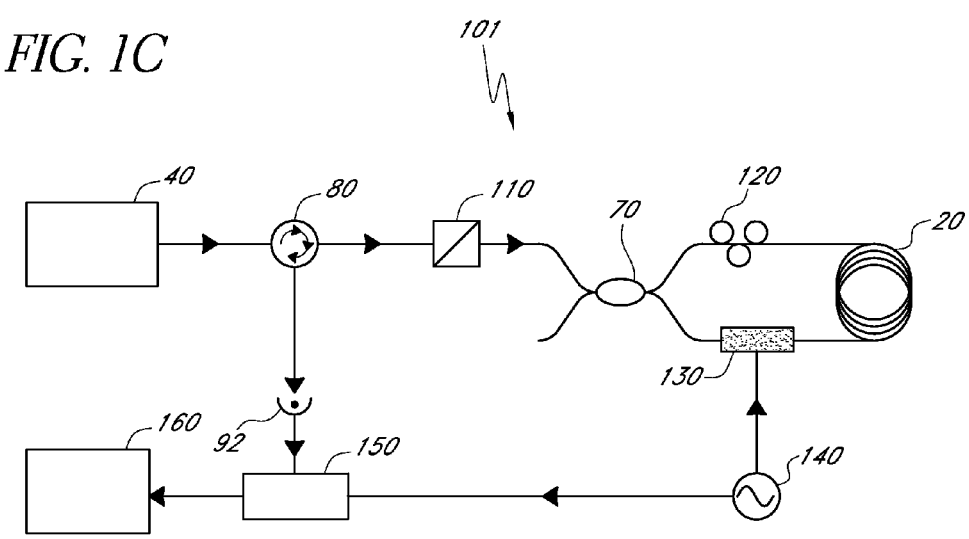

FIG. 1C schematically illustrates another example sensor 101 in accordance with certain embodiments described herein. The sensor 101 of FIG. 1C is another example of a fiber-optic gyroscope comprising a standard Sagnac loop which comprises the coil 20. The sensor 101 of FIG. 1C can be a FOG in the minimum configuration (see, e.g., H. C.

Lefèvre, "*The Fiber-Optic Gyroscope*," Artech House, Inc., Norwood, Mass. (1993)). Light from the laser source 40 is transmitted to the second optical coupler 80 (e.g., an optical circulator), through a polarizer 110, to the first optical coupler 70 which is closed upon itself by a polarization controller 120, the optical fiber coil 20, and an electro-optic (EO) phase modulator 130. The phase modulator 130 can be used to bias the sensor 101 in quadrature, thus improving the sensitivity of the sensor 101. In certain embodiments, the polarizer 110 and the phase modulator 130 are fiber-based or fiber-pigtailed components which are commercially available from a number of vendors and manufacturers (e.g., JDS Uniphase Corp. of Milpitas, Calif.).

Figure 1D:
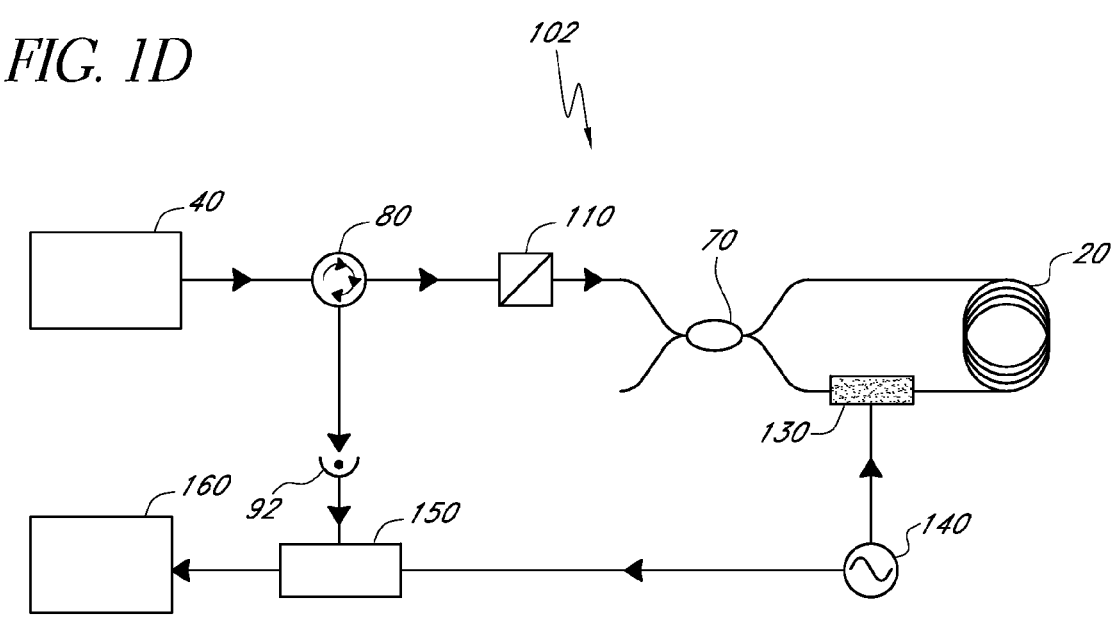

FIG. 1D schematically illustrates an example sensor 102 in accordance with certain embodiments described herein. The sensor 102 of FIG. 1D is another example of a fiber-optic gyroscope comprising a standard Sagnac loop which comprises the coil 20. In certain embodiments, the sensor 102 comprises a polarization-maintaining (PM) fiber downstream from the polarizer 110 (e.g., in the coil 20, between the polarizer 110 and the first optical coupler 70, and/or within the first optical coupler 70). In certain such embodiments, the entire optical path downstream from the polarizer 110 is PM fiber. In certain embodiments, the sensor 102 utilizes PM fiber throughout (i.e., downstream from the source 40). By utilizing PM fiber either along the entire optical path downstream from the polarizer 110 or throughout the sensor 102, certain embodiments obviate the use of the polarization controller 120 of the sensor 101 of FIG. 1C. Certain such embodiments advantageously avoid the need to adjust the polarization controller 120 (either manually, which cannot be done for an actual FOG, or with complicated feedback systems, which add cost and complexity). In certain other embodiments, a polarizing fiber can be used instead of the polarization-maintaining fiber discussed above. The phase modulator 130 of certain embodiments is driven by a function generator 140 which is coupled to a lock-in amplifier 150 which outputs a signal to a computer system 160. The lock-in detection at the proper frequency of the sensor 101, 102 in certain embodiments can advantageously improve the signal-to-noise ratio. With this phase modulation, the returning signal of interest is centered at the frequency of the phase modulation (i.e., at the proper frequency $f_0$).

In a manner similar to that discussed above with regard to the example configuration illustrated by FIG. 1B, for the sensor 101 schematically illustrated by FIG. 1C, the backscattered light due to only one of the counterpropagating signals propagates through the phase modulator 130. For example, for the first signal 52 propagating through the polarization controller 120 then through the rest of the coil 20 and then through the phase modulator 130, any backscattered light produced within the coil 20 will propagate towards the polarization controller 120 and away from the phase modulator 130 before reaching the first optical coupler 70. Conversely, for the second signal 56 propagating through the phase modulator 130, then through the coil 20, and then through the polarization controller 120, any backscattered light produced within the coil 20 will propagate through the phase modulator 130 before reaching the first optical coupler 70. The backscattered light that does not propagate through the phase modulator 130 is thus not phase modulated, and therefore does not contribute to the backscattering noise at the detection frequency. Such a configuration is different from other configurations (e.g., J. Zheng, "*All-fiber single-mode fiber frequency-modulated continuous-wave Sagnac gyroscope*," Optics Letters, Vol. 30, pp. 17-19 (2005) and J. Zheng, "*Differential birefringent fiber frequency-modulated continuous-wave Sagnac gyroscope*," IEEE Photonics Technology Letters, Vol. 17, pp. 1498-1500 (2005)) in which both backscattered signals are modulated so both contribute to the noise.

Figure 1E:
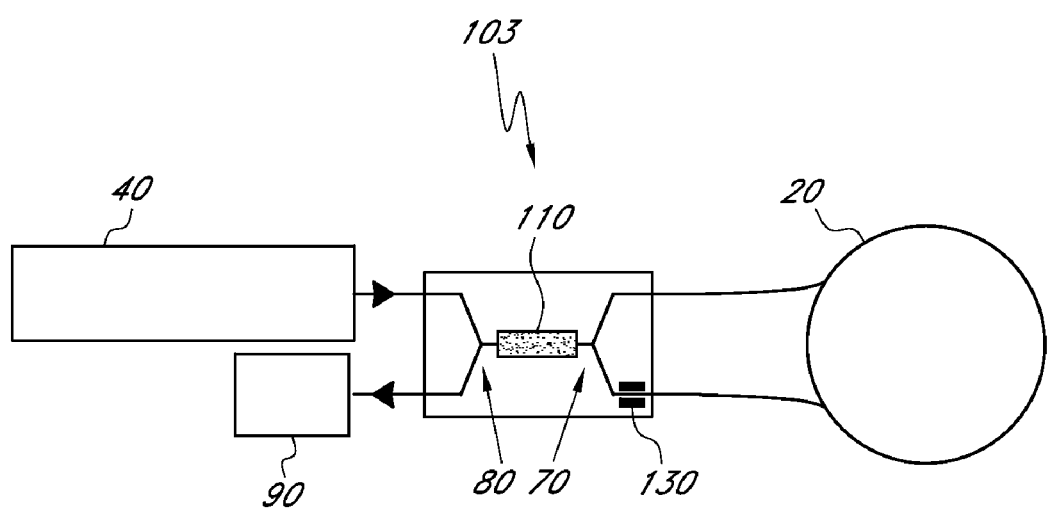

FIG. 1E schematically illustrates an example sensor 103 in accordance with certain embodiments described herein. The sensor 103 of FIG. 1E is another example of a fiber-optic gyroscope comprising a standard Sagnac loop which comprises the coil 20. The sensor 103 of FIG. 1E is an integrated optic chip in which the FOG components are all made on a chip (LiNbO$_3$), in accordance with the standard method to make a commercial FOG. In certain such embodiments, the key components of the sensor 103, including but not limited to the first optical coupler 70 (e.g., a Y junction), the second optical coupler 80 (e.g., a Y junction), the polarizer 110, and the phase modulator 130, are all fabricated using standard technology on the same integrated optic chip, for example on LiNbO$_3$, which presents certain well-recognized advantages of compactness, mechanical stability, and ease and reduced cost of large-scale manufacturing. In certain embodiments, the coil 20 comprises a polarization-maintaining fiber. In certain other embodiments, a polarization controller can be positioned at an appropriate point (e.g., between the source 40 and the integrated optic chip) to control the polarization of light entering the polarizer and to ensure that the signal output state of polarization is aligned with respect to the polarizer transmission axis, thereby maximizing the optical power transmitted by the polarizer. In certain embodiments, the coil 20 comprises a polarization-maintaining air-core fiber.

Figure 2:
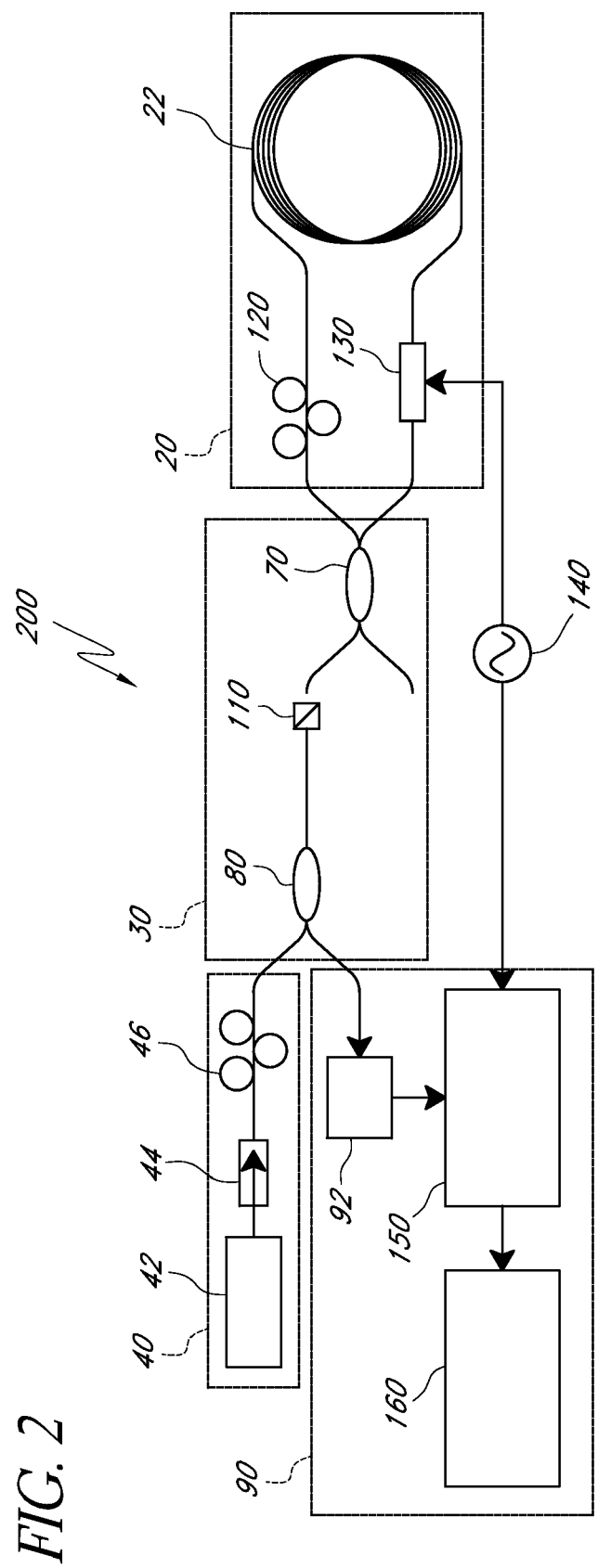
FIG. 2 shows a diagram of an example configuration of a fiber optic gyroscope (FOG) in accordance with certain embodiments described herein.

FIG. 2 is a diagram of an example experimental configuration of an open-loop fiber gyroscope 200 in accordance with certain embodiments described herein. It uses a Sagnac interferometer made of a fiber coil 20 comprising a plurality of substantially concentric loops 22 having a length of 235 m of either air-core fiber (e.g., HC-1550-02 from Crystal Fibre) or conventional fiber (e.g., Corning's SMF-28 fiber), both coiled in a quadrupolar winding. The coil 20 further comprises a polarization controller 120 and a fiber-pigtailed electro-optic phase modulator 130. A light source 40 comprises a laser 42, an optical isolator 44, and a polarization controller 46. Light from the light source 40 is sent through at least one optical coupler 30 (e.g., comprising a first 3-dB optical coupler 70, a second 3-dB optical coupler 80, and a fiber polarizer 110 as shown in FIG. 2) and coupled into the coil 20 in both the clockwise (cw) and counterclockwise (ccw) directions. After traveling around the coil 20, the signals return to and interfere at the first 3-dB optical coupler 70. The optical signal from the at least one optical coupler 30 (e.g., from the second 3-dB optical coupler 80) is received by the detector system 90 (e.g., comprising a photodiode 92, a lock-in amplifier 150, and a computer 160, as schematically illustrated by FIG. 2). Through the Sagnac effect, this interference yields an output signal power that depends on the rotation rate imparted to the coil 20. The interferometer was biased for maximum sensitivity with the fiber-pigtailed electro-optic phase modulator 26 placed asymmetrically in the coil 20 and operated at the loop proper frequency (e.g., in response to signals from the function generator). See H. Lefèvre, cited previously, for details.

As discussed above, backscattering noise occurs when photons from the cw signal are scattered into the ccw direction by Rayleigh scattering (and vice versa). These backscattered photons are captured by the fundamental mode of the fiber, interfere with the primary ccw wave, and induce noise. Scattered photons that are coherent with the primary waves produce interference and noise. Photons that are incoherent with the primary waves produce intensity noise, which is typically negligible. It follows that coherent backscattering noise arises from the scatterers located along a length of fiber equal to the coherence length of the light $L_c$ centered on the mid-point of the loop. When $L_c$ is short enough compared to the loop length L, as applies to a broadband source ($L_c \approx 10$-100 μm), coherent backscattering noise is negligible compared to other sources of noise. When $L_c$ is equal to a few meters or longer, as applies to a laser, coherent noise typically dominates. As discussed below, to predict theoretically the magnitude of this noise in a PBF FOG, the backscattering coefficient of an air-core fiber was predicted, and backscattering noise in a Sagnac loop probed with a laser of arbitrary coherence was modeled, which had not been done previously.

Only one measurement of backscattering in an air-core fiber has previously been reported. See M. Wegmuller, M. Legré, N. Gisin, T. P. Hansen, C. Jakobsen, and J. Broeng, "Experimental investigation of the polarization properties of a hollow core photonic bandgap fiber for 1550 nm," *Opt. Expr.*, Vol. 13, No. 5, 1457-1467 (March 2005). It was performed in Crystal Fibers' AIR-10-1550 fiber at 1.55 μm. Based on a private communication with M. Legré, the backscattering coefficient inferred from this measurement was $1.58 \times 10^{-6}$ m$^{-1}$. In a PBF, one expects that backscattering arises mainly from random perturbations of the fiber index profile along the propagation direction, and that bulk scattering in the silica portions of the fiber is negligible. As a confirmation, a theoretical model has been developed that calculates the mode coupling loss and backscattering coefficient of the fundamental ($HE_{11}$) mode of a PBF with random, azimuthally symmetric deformations of its index profile. See V. Dangui, M. J. F. Digonnet, and G. S. Kino, "Modeling of the propagation loss and backscattering in air-core photonic-bandgap fibers," *IEEE J. Lightwave Technol.* Vol. 27, No. 17, 3783-3789 (Sep. 1, 2009). When applied to the air-core fiber, this model predicted that to replicate the fiber's measured loss (~24 dB/km), for the range of perturbation amplitude a likely to prevail in this fiber (0.5 to 3% of the crystal period), the perturbation characteristic length D was in the range of ~1 to ~30 cm. That this range is much shorter than the typical correlation length of a conventional single-mode fiber (~3 m) is consistent with the fact that PBFs are drawn at much slower speeds. This same perturbation yielded a predicted backscattering coefficient of $1.5 \times 10^{-6}$ m$^{-1}$, in good agreement with the experimental value. See, e.g., M. Wegmuller, M. Legré, N. Gisin, T. P. Hansen, C. Jakobsen, and J. Broeng, cited above. The backscattering coefficient is thus ~22 times higher in the 7-cell air-core fiber used in this work than in a conventional fiber such as Corning's SMF-28 fiber. Since the backscattering noise in a FOG scales like the square root of the backscattering coefficient, the backscattering noise in an air-core FOG is expected to be ~4.7 times larger than in a conventional FOG.

Several reports have developed analytic methods and models for predicting the effect of Rayleigh backscattering on the noise in a FOG. See e.g., K. Takada, "Calculation of Rayleigh backscattering noise in fiber-optic gyroscopes," *J. Opt. Soc. Am. A*, Vol. 2, No. 6 (June 1985); J. Mackintosh and B. Culshaw, "Analysis and observation of coupling ratio dependence of Rayleigh backscattering noise in a fiber optic gyroscope," *J. Lightwave Tech.*, Vol. 7, No. 9, 1323-1328 (1989); and K. Krakenes and K Blotekjaer, "Effect of laser phase noise in Sagnac interferometers," *J. Lightwave Tech.*, Vol. 11, No. 4, 643-653 (1993). However, in order to obtain a closed form solution, all these studies relied on the assumption that the coherence length $L_c$ of the source was much shorter than the loop length L. None of these studies examined the quantitative dependence of the coherent backscattering noise on the source coherence length (i.e., they all specialized to an extremely short coherence length), and none incorporated the effect of phase modulation. As explained above, a gyroscope in accordance with certain embodiments described herein can utilize a laser source with a coherence length considerably longer than the typical coherence length of a broadband source, even up to coherence lengths on the order of, or longer than, the loop length. In this configuration, the solutions published by prior studies fail to predict the proper noise due to Rayleigh backscattering. As discussed herein, a new numerical model has been developed to simulate this process in software and to predict the noise in a gyroscope for an arbitrary coherence length. In addition, as described herein, a new analytical model has been developed based on the equations published by Krakenes and Blotekjaer, but without the approximation of negligible coherence length that they made towards the later part of their derivation. However, a closed form analytical solution is obtained only in the special case of no phase modulation in the interferometer. This exact solution was nevertheless useful in verifying that in the limit of no phase modulation, the numerical model and the analytical model produced the same solutions, which they did.

The formulation described herein follows most closely that developed in Krakenes and Blotekjaer. Krakenes and Blotekjaer seem to go further in their calculation before relying on the low coherence approximation than other authors. Rather than the six-port coupler and DC phase bias they examined (see Krakenes and Blotekjaer), the configuration discussed herein (shown schematically in FIG. 3) is a more standard configuration of a sensor 300 (e.g., FOG) with a four-port coupler 30 and sinusoidal phase modulation for bias as an example of a certain embodiment described herein.

Figure 3:
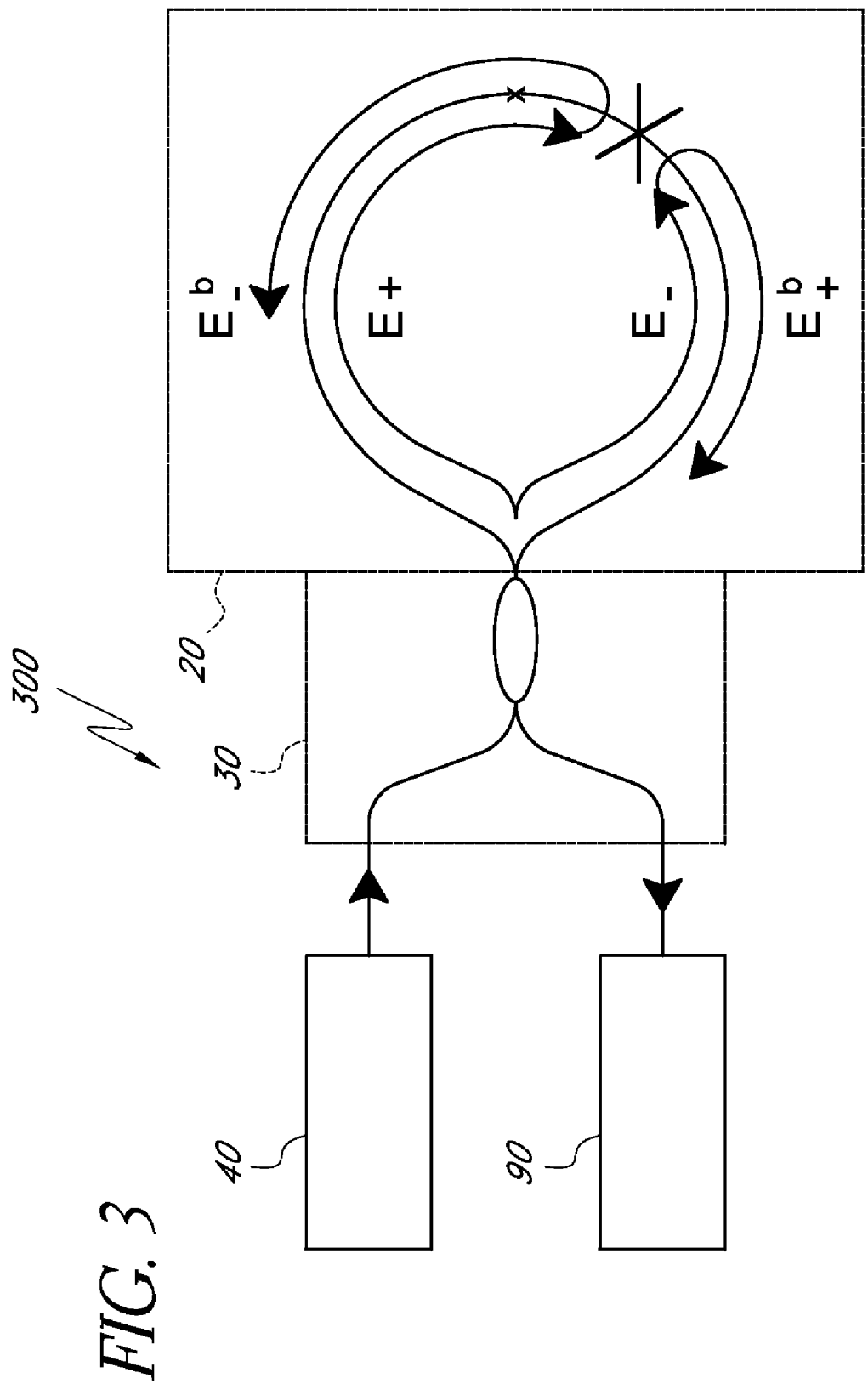
FIG. 3 shows a diagram of the four components of the output field from the fiber loop at port 1.

As illustrated in FIG. 3, the output field from the fiber loop 20 at port 1 consists of four components, namely the two primary waves $E_+$ and $E_-$ traveling in the clockwise and counterclockwise directions, respectively, and two scattered waves $E_-^b$ and $E_-^b$. If the complex input field at port 1 is expressed as $E_0 e^{j[\omega_0 \cdot t + \phi(t)]}$, where $\omega_0$ is the center angular frequency of the source, and $\phi(t)$ is the source phase noise for a finite source linewidth as a function of time, then the four components of the output field can be expressed as $$E_+(t) = E_0 a_{13} a_{14} e^{j[\omega_0 \cdot (t-L/v) + \phi(t-L/v) + \Phi(t) + \psi_s/2]} e^{-\alpha L/2} \quad (1)$$

$$E_-(t) = E_0 a_{14} a_{13} e^{j[\omega_0 \cdot (t-L/v) + \phi(t-L/v) + \Phi(t-L/v) - \psi_s/2]} e^{-\alpha L/2}$$

$$E_+^b(t) = E_0 a_{14} a_{14} \int_0^L jA(z) e^{j[\omega_0 \cdot (t-2z/v) + \phi(t-2z/v) + \Phi(t) + \Phi(t-2z/v)]} e^{-\alpha z} dz$$

$$E_-^b(t) = E_0 a_{13} a_{13} \int_0^L jA(L-\eta) e^{j[\omega_0 \cdot (t-2\eta/v) + \phi(t-2\eta/v)]} e^{-\alpha \eta} d\eta$$

The coefficients $a_{ij}$ represent the complex coupling coefficients between ports n and m of the 2×2 coupler (the coupler is reciprocal, so $a_{ji} = a_{ij}$), v is the group velocity of the optical mode in the fiber, $\Psi_s$ is the rotation-induced Sagnac phase shift, α is the intensity attenuation coefficient of the fiber, A(z) is a random variable representing the Rayleigh scattering coefficient at position z, and $\Phi(t)$ is the loop phase modulation used for bias. The extra factor of j in the expressions for $E_+^b$, and $E_-^b$ is a consequence of the Rayleigh scattering process, which adds a π/2 phase shift to the field that is backscattered. See e.g., M. Nakazawa et. al, "Analyses of optical time-domain reflectometry for single-mode fibers and of polarization optical time-domain reflectometry for polarization-maintaining fibers," *Optics Letters*, Vol. 8, No. 2, 130-132 (1983). A(z) is therefore assumed to be real.

At the output of the coupler 30 of the gyroscope, all of these waves interfere. The returning signal of the FOG is contained in the interference of the primary waves $E_+$ and $E_-$, while interference occurring between a primary wave and a backscattered wave constitutes an error signal. Random phase fluctuations present in any finite linewidth source are converted by this interference process into intensity fluctuations in the output signal. These fluctuations ultimately limit the minimum detectable rotation rate of the gyroscope. This source of noise is referred to as coherent backscattering noise, or Rayleigh scattering noise.

A slightly more useful form of the fields represented in Eq. (1) can be obtained by defining $$\tilde{E} = a_{13}a_{14}E_0 e^{j[\omega_0 \cdot (t-L/v) + \phi(t-L/v)]}e^{-\alpha L/2} \quad (2)$$

Eq. (1) then becomes $$E_+(t) = \tilde{E}e^{j[\Phi(t) + \psi_s/2]} \quad (3)$$

$$E_-(t) = \tilde{E}e^{j[\Phi(t-L/v) - \psi_s/2]}$$

$$E_+^b(t) = \tilde{E}\frac{a_{14}}{a_{13}}\int_0^L jA(z)e^{j[\omega_0 \cdot \frac{L-2z}{v} + \tilde{\phi}(t-L/v, \frac{L-2z}{v}) + \Phi(t) + \Phi(t-2z/v)]}e^{\frac{\alpha}{2}(L-2z)}dz$$

$$E_-^b(t) = \tilde{E}\frac{a_{13}}{a_{14}}\int_0^L jA(\eta)e^{j[\omega_0 \cdot \frac{2\eta-L}{v} + \tilde{\phi}(t-L/v, \frac{2\eta-L}{v})]}e^{\frac{\alpha}{2}(2\eta-L)}d\eta$$

P where $\tilde{\phi}(t,\tau) = \phi(t+\tau) - \phi(t)$ and the variable of integration in the second integral is shifted for clarity.

In order to calculate $E_+^b$, and $E_-^b$, the integration in Eq. (3) can be simulated by dividing the fiber into a large number N of short segments of equal length, each of which contains in its center a scatterer. The amplitude of the field backscattered by the segment at location z along the Sagnac loop is the random variable A(z) defined earlier. Environmental perturbations of the fiber cause this distribution to vary. The time constant of these variations is much longer than the loop delay; consequently, these perturbations contribute to a drift in the FOG signal rather than a noise, and they can be ignored in this model. On the other hand, the phase of the field backscattered is equal to the phase of the incident light at z plus a phase shift on reflection of $\pi/2$. The incident light has phase noise, which depends on the linewidth of the source. It is therefore the randomness in the phase of the backscattered photons, not in their amplitude, that is mainly responsible for coherent backscattering noise. This phase noise mainly comes directly from the incident light itself, not the scatterers.

At the start of a simulation, a particular random distribution A(z) is selected for the fiber, from z=0 to z=L. For the reason provided above, A(z) is taken to be time independent.

By discretizing the fiber into N segments and approximating A(z) as explained, the integral in the expression for $E_+^b$ found in Eq. (3) becomes $$\int_0^L jA(z)e^{j[\omega_0 \cdot \frac{L-2z}{v} + \tilde{\phi}(t-L/v, \frac{L-2z}{v}) + \Phi(t) + \Phi(t-2z/v)]}e^{\frac{\alpha}{2}(L-2z)}dz \approx$$

$$\sum_{n=0}^{N=L/\Delta z} jA(n)e^{j[\omega_0 \cdot \frac{L-n2\Delta z}{v} + \tilde{\phi}(t-L/v, \frac{L-n2\Delta z}{v}) + \Phi(t) + \Phi(t-n2\Delta z/v)]}e^{\frac{\alpha}{2}(L-n2\Delta z)}\Delta z, \quad (4)$$

with a similar expression for $E_-^b$.

For a statistically homogeneous fiber medium and for the length scale under consideration here ($\Delta z$ is assumed much larger than one optical wavelength), the autocorrelation function of A(n) is given by E. Brinkmeyer, "Analysis of the backscattering method for single-mode fibers," *J. Opt. Soc. Am.* Vol. 70, 1010-1012 (1980) as $$\langle A(n)A(n')\rangle = \alpha_b \delta_{nn'} \quad (5)$$

where $\delta_{nn'}$ is the Kronecker delta and $\langle \cdot \rangle$ represents an ensemble average.

The source phase is assumed to follow a Wiener-Levy process. As such, the phase difference between any two points in time depends on the temporal delay between these points. The phase noise is then described by a Gaussian probability function, with a width proportional to the linewidth of the source.

So, if $\tilde{\phi}(t,\tau) = \phi(t+\tau) - \phi(t)$ then $\tilde{\phi}(t,\tau)$ is described by the probability density function $$P(\tilde{\phi}) = \frac{1}{\sqrt{2\pi\sigma^2(\tau)}}e^{-\tilde{\phi}^2/2\sigma^2(\tau)} \quad (6)$$

with $$\sigma^2(\tau) = 2\pi\Delta f|\tau| \quad (7)$$

where $\Delta f$ is the full-width at half-maximum (FWHM) of the source. Furthermore, the phase changes over two different intervals $\tilde{\phi}_1(t,\tau_1)$ and $\tilde{\phi}_2(t,\tau_2)$ is taken to be statistically independent for non-overlapping time intervals.

With these assumptions, there is enough information to simulate the effect of backscattering in a FOG with an arbitrary source coherence. The model can be used to calculate the total field backscattered from the cw signal in the ccw direction (and vice versa) by summing the contributions of all N scatterers, taking into account the phase delay due to propagation to each scatterer and back, the fiber loss, and the phase statistics of the source. The two primary and two backscattered fields can then be added at the output of the coupler to obtain the total signal returning from the loop. This coherent addition (interference) converts the random phase fluctuations in the source into intensity fluctuations in the output signal. The simulations can be repeated for several hundred integration periods, each time with a new input signal phase distribution, after which the noise and angular random walk of the gyroscope are obtained.

To carry out the simulation, random backscattering coefficients for each segment n in the discretized fiber can be generated in software from the statistics given by Eq. 5. Similarly, the random walk of the source phase noise can be generated according to Eq. 6 for subsequent time intervals. The calculations described by Eq. 4 can then be carried out to obtain the time dependent forms of $E_+^b$ and $E_-^b$. The total error signal measured at the detector can be calculated using $$I_b(t) = [E_+^b(t) + E_-^b(t)] \cdot [E_+^*(t) + E_-^*(t)] + cc \quad (8)$$

When a sinusoidal phase modulation is applied to the FOG loop for biasing purpose, the error signal can be further processed by extracting the in-phase component of the signal at the first harmonic of the modulation frequency, as is done in practice in a FOG. See again H. Lefevre, previously cited. The standard deviation of this signal, normalized by the square root of the measurement bandwidth, is the FOG angular random walk, which quantifies the rotation-rate error caused by coherent backscattering noise. Since the result obtained by this process is specific to the particular distribution of backscattering coefficients (A(n)) chosen for the discretized fiber, the entire process can be repeated with different distributions of A(n) and averaged over a large number of distributions to accurately predict the expected noise due to Rayleigh backscattering.

Figure 4:
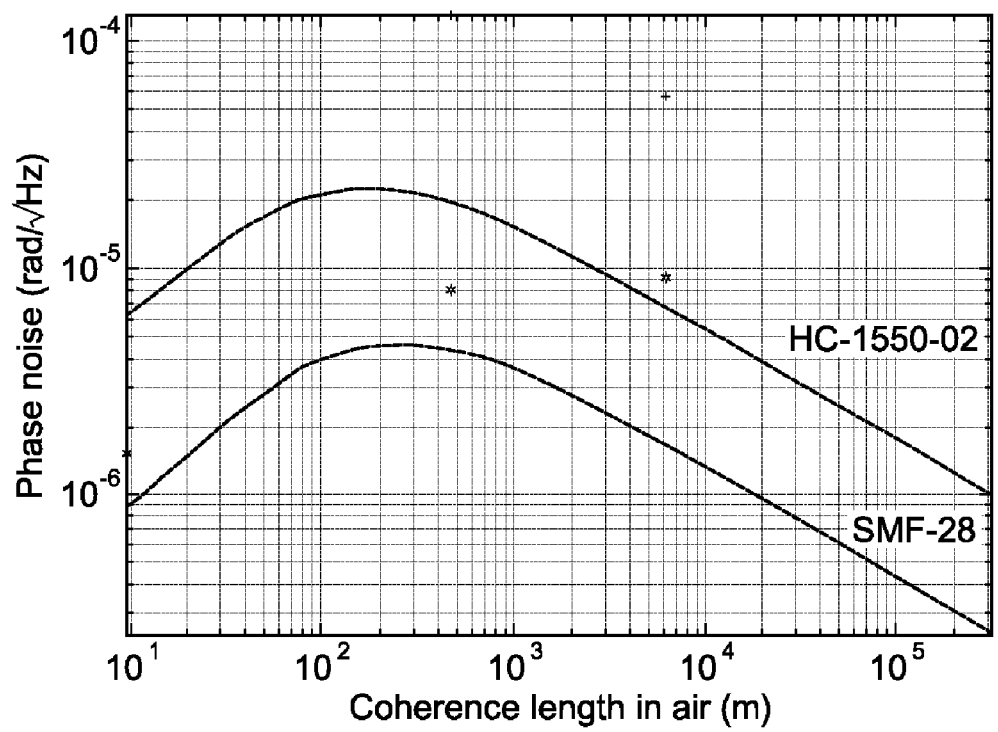
FIG. 4 shows simulated and experimental results of FOG noise vs. source coherence length for a solid-core FOG and an air-core PBF FOG in accordance with certain embodiments described herein.

Because the mathematical model outlined above was kept as general as possible while relying on the fewest number of assumptions, it is a powerful tool for exploring various aspects of a FOG. One interest was understanding the effect of linewidth on the noise properties of the Rayleigh backscattered signal. FIG. 4 shows the result of using this model to calculate the average noise due to Rayleigh backscattering for a varying source linewidth. This curve of the phase noise versus coherence length was simulated for a FOG in accordance with certain embodiments described herein with a conventional solid-core fiber (Corning's SMF-28 fiber) loop length of 235 m, a loop loss of 0.2 dB/km, a laser wavelength in vacuum of 1.5 µm, and a sinusoidal phase modulation at the proper frequency $f_0$=425 kHz. It was generated by running the simulator for a sufficient number of iterations (about 100 random distributions of scatterers along the fiber length) to guarantee convergence, and averaging the curves. As the coherence length drops well below the loop length, a diminishing fraction of the scatterers contribute to the coherent noise, and the noise decreases. This behavior has been the rationale behind using a broadband light source as the primary means for reducing backscattering noise for many years. As the linewidth of the source broadens, the fields scattered by each of the individual scatterers no longer interfere coherently, which averages out the effects of the source phase fluctuations over time and reduces the noise in the output signal. A new implication of this curve is that it enables one to predict quantitatively for the first time the exact backscattering noise for a gyroscope operated with a coherence length intermediate between that of a broadband source (typically tens of microns) and the length of the sensing coil (typically 100 m or more). In particular, it gives the ability to select the coherence length to achieve a desired level of backscattering noise.

In addition, the right portion of the curve exhibits a trend that has never been reported previously: when $L_c$ increases above L, the noise actually decreases. By using a highly coherent source, the noise can actually be brought to the level observed in a typical FOG operated with a broadband source. Increasing $L_c$ beyond L does not add any more scatterers. While increasing the source coherence length increases the coherent scattering length, once the source coherence exceeds the length of the loop, there is no more length to add. The reason why the noise actually decreases is that increasing the coherence length reduces the phase fluctuations of the light, and hence the fluctuations in the backscattered light. The mean value of the backscattered signal, e.g., its power, is not reduced, but its standard deviation, e.g., the noise, is reduced. This ultimately leads to a reduction of the noise due to Rayleigh backscattering for highly coherent sources, as shown in FIG. 4. The noise level is higher with the PBF, approximately by the predicted factor of about 4.7, because this fiber has a higher backscattering coefficient.

FIG. 4 shows that on the right side of the peak in the curve, for both the conventional solid-core fiber and the PBF, the noise decreases roughly as the square root of the coherence length as the coherence length is increased. This effect is nonetheless significant: with a sufficiently coherent source, the backscattering noise can be reduced by more than one order of magnitude compared to its peak value. In accordance with certain embodiments described herein, this novel effect is applicable to a conventional FOG, which can be driven with a high-coherence source. In certain such embodiments, the Kerr-induced drift is reduced by other means, for example by applying a 50% square-wave amplitude modulation to the input light, as discussed above. For example, in a FOG using a conventional solid-core fiber loop, a source linewidth of 6 kHz ($L_c \approx 1.6 \times 10^4$ m in air) can be used and the noise can be brought down to the excess noise measured in this same FOG driven with a typical SFS, around 1 µrad/√Hz. In such a FOG, because a solid-core fiber is used in the sensing coil, the Kerr-induced drift may be too strong, but in certain embodiments, this deleterious effect can be reduced by applying a 50% square-wave amplitude modulation to the input laser light, in a manner that is well known in the art. Such a high-coherence source is readily available commercially.

In accordance with certain embodiments described herein, the air-core FOG can use a high-coherence source and be less affected by such noise because the use of a laser results in a considerably weaker non-reciprocal Kerr-induced phase drift. For the 7-cell PBF in accordance with certain embodiments described herein, the corresponding linewidth to reduce the backscattering noise of an air-core FOG to the excess noise of a conventional FOG using a solid-core fiber and a broadband source is about 320 Hz, which is currently difficult to achieve. Two straightforward steps can be used with larger linewidths in certain embodiments described herein. First, the fiber can be replaced by a 19-cell fiber, which has a much lower loss (~1.2 dB/km) and therefore expectedly a much lower backscattering coefficient. See B. J. Mangan, et al., "Low loss (1.7 dB/km) hollow core photonic bandgap fiber," in *Proc. Opt. Fiber. Commun. Conf.* (2004), paper PDP24. Second, the frequency of the laser can be modulated to shift the coherent backscattering interference energy away from the signal frequency. See U.S. patent application Ser. No. 12/271,760, filed Nov. 14, 2008 and incorporated in its entirety by reference herein; S. Blin, M. J. F. Digonnet, and G. S. Kino, "Fiber optic gyroscope operated with a frequency-modulated laser," *Conf on Optical Fiber Sensors*, Perth, Australia, *Proc. SPIE* Vol. 7004, 70044X-1-4 (April 2008). Combined, in certain embodiments, these two improvements can bring the backscattering noise below the excess-noise limit with a practical narrow linewidth.

Another aspect of certain embodiments described herein relates to the average backscattered power generated by Rayleigh backscattering in the sensing coil. As mentioned above, as the coherence length of the source is increased, the total number of scatterers involved in the coherent backscattering process increases, and the mean power that is backscattered by the fiber (in both direction) increases. This additional signal interferes with the two primary waves at the loop coupler, which has two effects. First, it produces a mean DC offset in the output of the gyroscope. Second, because the primary waves and the backscattered waves travel different optical paths (e.g., some of the scattered photons were generated near one end of the loop, and have therefore experienced a different overall phase shift than the primary waves), their relative phase varies with temperature. As a consequence, the coherent sum of these four fields depends on temperature. As the temperature of the coil fiber varies, the total output of the gyrsocope coil varies, in a manner that is indistinguishable from a rotation.

Figure 5:
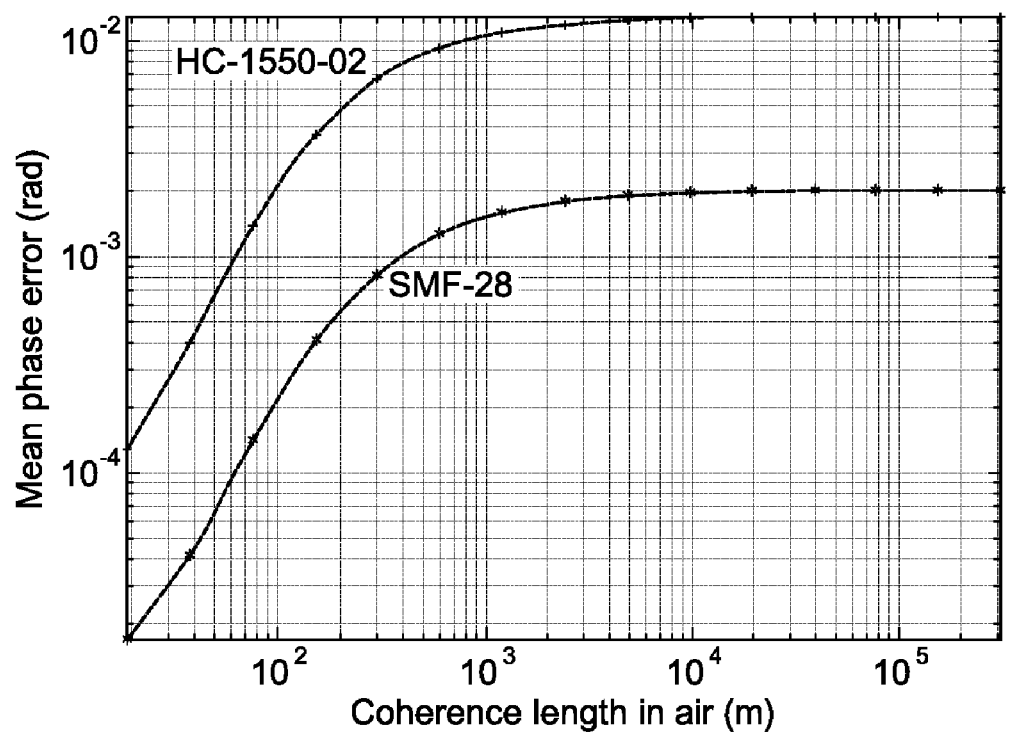
FIG. 5 shows simulated results of FOG mean phase error vs. source coherence length for the solid-core FOG and the air-core PBF FOG in FIG. 4 using the numerical model described herein.

The predicted magnitude of this effect can be seen in FIG. 5, which plots the mean phase error (or offset) in the two modeled gyroscopes (FOG with solid-core SMF-28 fiber and FOG with air-core PBF) as a function of source coherence length. For very short coherence length, for example available from an SFS, the coherence length in silica is of the order of 10 µm and the mean phase error in an SMF-28 FOG is negligible (out of the range shown in the figure). With a laser of coherence length of ~2 km or longer, the phase offset is approximately maximum and equal to ~2 mrad. The offset is higher for the PBF FOG (see top curve in FIG. 5) because again the backscattering is higher.

FIG. 5 demonstrates that when selecting the coherence length of the laser in certain embodiments, the DC offset that will result from the use of a laser is advantageously considered. For longer coherence lengths, the noise drops (see FIG. 4) but the DC offset (and therefore the long-term drift) increases. For both fibers, this offset and the offset drift associated with it are undesirable. However, if the offset is stable, it can be measured while the FOG is at rest, then subtracted from the measured signal when the FOG is operating and rotated. If the FOG is not stable enough, this signal processing step in certain embodiments cannot be applied. Thus, in certain embodiments, this DC offset is stabilized, for example by one or more of the following: stabilizing the temperature of the coil, ensuring that the coil is wound symmetrically, minimizing the length of the pigtails coming out of the coil, and/or placing the pigtails in close proximity to minimize temperature gradients between them. Another possible method for reducing the DC offset due to the backscattered signals is to use the method described in I. P. Giles, J. Mackintosh, J. McMillan, and B. Culshaw, "*Coherent backscatter-induced drift in phase-modulated optical fiber gyroscopes*," Electron. Lett., Vol. 22, No. 9, 494-496 (1986), which involves properly selecting the modulation amplitude of the phase modulation such that the main components of this spurious signal are cancelled.

In certain embodiments, a fiber-optic sensor is operated by providing a fiber-optic sensor comprising an optical fiber coil having an optical length and a laser source optically coupled to the coil. The laser source has a coherence length such that the sensor has a phase noise below a predetermined value, and the coherence length is less than the optical length. Operating the fiber-optic sensor further comprises stabilizing a DC offset of the sensor, for example, using one or more of the techniques mentioned above. Light from the source to the coil is transmitted as a first signal and a second signal. The first signal propagates along the coil in a first direction and the second signal propagates along the coil in a second direction opposite to the first direction, with the optical paths of the first signal and the second signal are substantially reciprocal with one another. The first signal and the second signal are then combined together to generate a third signal, which is detected to measure the perturbation of the sensor (e.g., the rotation of the FOG).

It is clear from FIGS. 4 and 5 that another way to strike a satisfactory compromise between backscattering noise and DC offset in certain embodiments is to reduce the coherence length of the source below the loop length. By doing so, FIG. 4 indicates that the noise decreases rapidly (roughly proportionally to the coherence length), while FIG. 5 shows that the DC offset also decreases rapidly (also roughly proportionally to the coherence length). A preferred mode of operation in certain embodiments described herein therefore includes operating on the left side of the curves in FIG. 4, without reducing the coherence length so much that it becomes so short the mean wavelength stability starts to suffer again, as it does in an SFS for example. FIG. 4 shows that in the SMF-28 FOG used here as an example, a coherence length in air of ~9.5 m or less (linewidth of ~10 MHz or more) will produce a backscattering phase noise of ~0.85 µrad/√Hz or less. It can be extrapolated from FIG. 5 that it will produce a phase offset (or error) of ~4 µrad or less. Similarly, a coherence length in air of ~0.95 m (linewidth of ~100 MHz) will produce a backscattering phase noise of ~0.2 µrad/√Hz or less and a DC offset below 1 µrad.

Some of these results were confirmed experimentally by testing the sensor 200 of FIG. 2 in accordance with certain embodiments described herein with three lasers of increasingly long coherence lengths, namely a DFB laser (~10-MHz linewidth, or a coherence length in silica of 6.5 meters), a tunable laser (200 kHz, or a coherence length in silica of 325 meters), and DFB laser (15 kHz, or a coherence length in silica of 4.3 kilometers). The dependence of the backscattering noise on the source coherence length was verified experimentally in two fiber optic gyroscopes, one made with 235 m of Corning's SMF-28 fiber, the other one with 235 m of HC-1550-02 air-core fiber from NKT Photonics in Denmark. Both fibers were quadrupolar wound on a mandrel of 8.5-cm diameter. The PBF gyroscope had the configuration shown in FIG. 2. The SMF-28 gyroscope used the same configuration, except that the main components (the polarizer, the 3-dB coupler, and the phase modulator) were fabricated on a conventional monolithic LiNbO$_3$ planar structure utilizing optical waveguides. For each gyroscope, the dependence of the phase noise at the output of the gyroscope was measured as a function of integration time in the lock-in amplifier (see FIG. 2) for lasers with different coherent lengths (or linewidth). The slope of the noise dependence on square root of integration time gave the random walk of the gyroscope. For comparison, the noise was also measured in these two gyroscopes with an Er-doped superfluorescent fiber source (SFS). In all four measurements the power of the sources were adjusted such that the output power of the FOG was the same.

Experimental results are plotted in FIG. 4 as individual dots for each of these lasers. FIG. 4 shows the three data points measured for the SMF-28 gyroscope with different lasers by asterisk symbols (*). For the SMF-28 FOG, the noise is only slightly higher than predicted by the model for the two shortest coherence lengths. These two data points confirm the quantitative prediction of how much the noise increases with increasing coherence length. For comparison, the random walk (RW) measured with the SFS was 1.2 µrad/√Hz. This confirms experimentally the theoretical prediction that for a gyroscope operated with a laser of moderate coherence, namely a coherence length of 6.5 meters for a loop length of 235 meters in this particular embodiment, the gyroscope's RW can be very close to that of the same gyroscope operated conventionally with a broadband source. By using a laser with a slightly shorter coherence length (a meter for example, a few tens of centimeters, or a few centimeters), the RW would be even smaller, and the sensitivity of the FOG would be improved over the sensitivity of the same gyroscope interrogated with a broadband source. FIG. 4 shows that when the coherence length was increased to 4.3 kilometers, the noise did not decrease below the value measured with the 325-meter coherence length, unlike expected from the model. When performing these measurements, we also observed increased long-term variations in the output of the gyroscope, which had to be filtered out mathematically to infer the noise. These results suggest that the particular laser that was used might have had a higher phase and intensity noise than expected.

The long-term drift of the gyroscope output was also observed to increase significantly as the coherence length of the source is increased. For example, with the 10-MHz laser, the long-term drift measured over a period of a few hours was about ±7.5 µrad for a 1-s integration time, whereas it was only ±0.8 µrad when this gyroscope was operated with the SFS and the same integration time. This long-term drift was observed to increase significantly with both the 200-kHz linewidth laser and the 15-kHz linewidth source. These measurements are consistent with the general trend predicted by FIG. 5: as the linewidth decreases, the DC offset due to the mean value of the backscattered signal increases, and it eventually reaches a maximum when the coherence length greatly exceeds the loop length.

FIG. 4 shows similar results for the air-core FOG tested with two of the lasers, with the data point shown as a plus symbol (+). The main difference is that a reduction in the RW noise at longer coherence lengths was actually observed, presumably because the backscattering noise of the gyroscope dominated over other additional internal noise in the source itself. The experimental points are higher than the predicted best-case scenario, but show the predicted trend.

As described herein, simulations have shown that the coherent backscattering noise of a fiber optic gyroscope interrogated with a laser in accordance with certain embodiments described herein decreases when the coherence length of the laser is increased above the length of the sensing loop. This decrease is relatively slow, roughly as the square root of the laser linewidth, but sufficient to reduce the backscattering noise below the level of the excess noise in the same gyroscope interrogated conventionally with a broadband source. The first experimental evidence of this reduction in a conventional gyroscope has been obtained using a 235-m length of air-core fiber in accordance with certain embodiments described herein. This new principle can be advantageously used for a fiber optic gyroscope made with an air-core fiber in accordance with certain embodiments described herein, which is essentially immune to the Kerr effect but exhibits stronger backscattering than a conventional fiber. It is also applicable to a conventional gyroscope, in which the Kerr-induced drift can be eliminated by other means, for example with a square-wave modulation of the laser amplitude in accordance with certain embodiments described herein. This approach offers for the first time the potential of a fiber optic gyroscope with a shot-noise-limited detection, which will translate into a greater sensitivity.

In certain embodiments, in which the sensor has a phase noise which varies as a function of coherence length, the phase noise has a peak value at a predetermined value of coherence length (e.g., at or near the length of the coil), as shown in FIG. 4. In certain such embodiments, the coherence length is selected such that the phase noise is at least a factor of two less than the peak value of the phase noise. In certain embodiments, the coherence length of the laser source is less than the predetermined value. In certain embodiments, the coherence length is selected such that the sensor has a phase noise less than or equal to a predetermined value. For example, in certain embodiments, the coherence length of the narrowband source is selected such that the sensor has a phase noise less than it would have if driven by a broadband source. Typically, the phase noise resulting when the sensor is driven by a broadband source (e.g., an Er-doped SFS) is about 1 $\mu rad/\sqrt{Hz}$, or is in a range between about 0.5 $\mu rad/\sqrt{Hz}$ and about 2 $\mu rad/\sqrt{Hz}$. Thus, in certain embodiments, the coherence length of the narrowband source is selected to result in a phase noise less than about 1 $\mu rad/\sqrt{Hz}$, less than about 0.5 $\mu rad/\sqrt{Hz}$, or less than about 2 $\mu rad/\sqrt{Hz}$.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A fiber-optic sensor comprising:
an optical fiber coil having a length; and
a laser source optically coupled to the coil, the laser source having a coherence length, wherein light from the source is transmitted to the coil as a first signal propagating along the coil in a first direction and a second signal propagating along the coil in a second direction opposite to the first direction, wherein the optical paths of the first signal and the second signal are substantially reciprocal with one another and the first signal and the second signal are combined together after propagating through the coil to generate a third signal, wherein the coherence length is greater than 1 meter or is in a range between 200 microns and 10 centimeters.

2. The sensor of claim 1, wherein the coherence length is in a range between 500 microns and 10 centimeters.

3. The sensor of claim 1, wherein the coherence length is in a range between 1 millimeter and 10 centimeters.

4. The sensor of claim 1, wherein the coherence length is in a range between 1 millimeter and 1 centimeter.

5. The sensor of claim 1, wherein the coherence length is in a range between 1 centimeter and 10 centimeters.

6. The sensor of claim 1, wherein the coherence length is in a range between 1 meter and 1 kilometer.

7. The sensor of claim 1, wherein the coherence length is in a range between 1 meter and 100 meters.

8. The sensor of claim 1, wherein the coherence length is in a range between 10 meters and 100 meters.

9. The sensor of claim 1, wherein the coherence length is in a range between 10 meters and 1 kilometer.

10. The sensor of claim 1, wherein the coherence length is in a range between 100 meters and 10 kilometers.

11. The sensor of claim 1, wherein the coherence length is less than the length.

12. The sensor of claim 1, wherein the sensor has a phase noise which varies as a function of coherence length, the phase noise having a peak value at a predetermined value of coherence length, wherein the phase noise for the coherence length is at least a factor of two less than the peak value of the phase noise.

13. The sensor of claim 1, wherein the sensor has a phase noise which varies as a function of coherence length, the phase noise having a peak value at a predetermined value of coherence length, wherein the coherence length of the laser source is less than the predetermined value.

14. The sensor of claim 1, wherein the sensor has a phase noise which varies as a function of coherence length, wherein the coherence length results in a phase noise less than about 2 $\mu rad/\sqrt{Hz}$.

15. The sensor of claim 1, wherein the sensor has a phase noise which varies as a function of coherence length, wherein the coherence length results in a phase noise less than about 1 $\mu rad/\sqrt{Hz}$.

16. The sensor of claim 1, wherein the sensor has a phase noise which varies as a function of coherence length, wherein the coherence length results in a phase noise less than about 0.5 $\mu rad/\sqrt{Hz}$.

17. The sensor of claim 1, wherein the first signal and the second signal have the same frequency as the light from the laser source.

18. The sensor of claim 1, wherein the laser source has a mean wavelength stability greater than 1 part per million.

19. The sensor of claim 1, wherein the sensor is a fiber-optic gyroscope comprising a standard Sagnac loop which comprises the coil.

20. A method of operating a fiber-optic sensor, the method comprising:

providing a fiber-optic sensor comprising an optical fiber coil having a length and a laser source optically coupled to the coil, the laser source having a coherence length such that the sensor has a phase noise below a predetermined value, wherein the coherence length is less than the length;

stabilizing a DC offset of the sensor;

transmitting light from the source to the coil as a first signal and a second signal, the first signal propagating along the coil in a first direction and the second signal propagating along the coil in a second direction opposite to the first direction, wherein the optical paths of the first signal and the second signal are substantially reciprocal with one another; and combining the first signal and the second signal together to generate a third signal.

21. The method of claim 20, wherein a ratio of the coherence length to the length of the coil is greater than 0.1.

22. The method of claim 20, wherein the coherence length is greater than 1 meter or is in a range between 200 microns and 10 centimeters.

23. A method of configuring a fiber-optic sensor, the method comprising:

providing a fiber-optic sensor comprising a laser source and an optical fiber coil having a length, the coil optically coupled to the laser source such that light from the laser source is transmitted to the coil as a first signal propagating along the coil in a first direction and a second signal propagating along the coil in a second direction opposite to the first direction, wherein the optical paths of the first signal and the second signal are substantially reciprocal with one another and the first signal and the second signal are combined together after propagating through the coil to generate a third signal, the sensor having a phase noise which varies as a function of coherence length of the laser source; and selecting the laser source to have a coherence length such that the sensor has a phase noise less than a phase noise resulting when the sensor is driven by a broadband source.

24. The method of claim 23, wherein the coherence length is less than the length.

25. The method of claim 24, wherein a ratio of the coherence length to the length of the coil is greater than 0.1.

26. The method of claim 23, wherein the coherence length is greater than 1 meter or is in a range between 200 microns and 10 centimeters.

27. The method of claim 23, wherein the coherence length results in a phase noise less than about 2 μrad/√Hz.

28. The method of claim 23, wherein the coherence length results in a phase noise less than about 1 μrad/√Hz.

29. The method of claim 23, wherein the coherence length results in a phase noise less than about 0.5 μrad/√Hz.

30. The method of claim 23, wherein the first signal and the second signal have the same frequency as the light from the laser source.

* * * * *

UNITED STATES PATENT AND TRADEMARK OFFICE
CERTIFICATE OF CORRECTION

PATENT NO.        : 8,223,340 B2
APPLICATION NO.   : 12/767643
DATED             : July 17, 2012
INVENTOR(S)       : Digonnet et al.

Page 1 of 1

It is certified that error appears in the above-identified patent and that said Letters Patent is hereby corrected as shown below:

In Column 16, Line 37, change "$E_-^b$" to --$E_+^b$--.

In Column 17, Line 60, change "$\sum_{n=0}^{N-L/\Delta z}$" to --$\sum_{n=0}^{N=L/\Delta z}$--.

Signed and Sealed this
Fourth Day of December, 2012

David J. Kappos
*Director of the United States Patent and Trademark Office*